(12) United States Patent
Aziz et al.

(10) Patent No.: US 11,940,596 B2
(45) Date of Patent: Mar. 26, 2024

(54) SPECTACLE LENS WITH ANTIBACTERIAL AND/OR ANTIVIRAL PROPERTIES AND METHOD FOR MANUFACTURING THE SAME

(71) Applicants: Carl Zeiss Vision International GmbH, Aalen (DE); Carl Zeiss Vision (China) Ltd., Guangzhou (CN)

(72) Inventors: Emad Flear Aziz, Aalen (DE); Liu Ouyang, Guangzhou (CN); Marc Wawerla, Aalen (DE); Haiming You, Guangzhou (CN)

(73) Assignees: Carl Zeiss Vision International GmbH, Aalen (DE); Carl Zeiss Vision (China) Ltd., Guangzhou (CN)

(*) Notice: Subject to any disclaimer, the term of this patent is extended or adjusted under 35 U.S.C. 154(b) by 0 days.

(21) Appl. No.: 18/158,344

(22) Filed: Jan. 23, 2023

(65) Prior Publication Data

US 2023/0161081 A1 May 25, 2023

Related U.S. Application Data

(63) Continuation of application No. PCT/EP2021/070730, filed on Jul. 23, 2021.

(30) Foreign Application Priority Data

Jul. 24, 2020 (WO) ............... PCT/CN2020/104011

(51) Int. Cl.
*G02B 1/18* (2015.01)
*B29D 11/00* (2006.01)
*G02C 7/02* (2006.01)

(52) U.S. Cl.
CPC .......... *G02B 1/18* (2015.01); *B29D 11/00865* (2013.01); *G02C 7/02* (2013.01)

(58) Field of Classification Search
CPC ... G02B 1/18; G02B 1/10; G02B 1/11; G02B 1/111; G02B 1/113; G02B 1/115; G02B 1/12; G02B 1/14; B29D 11/00865; B29D 11/00923; B29D 11/0073; B29D 11/0074; B29D 11/00788; G02C 7/02
USPC .............. 351/159.57, 159.6–159.62, 159.73, 351/159.74, 159.07
See application file for complete search history.

(56) References Cited

U.S. PATENT DOCUMENTS

| | | | |
|---|---|---|---|
| 5,454,886 A | 10/1995 | Burrell et al. | |
| 8,982,466 B2 | 3/2015 | Neuffer | |
| 9,278,885 B2 | 3/2016 | Lacan et al. | |
| 9,778,484 B2 | 10/2017 | Faul et al. | |
| 9,957,398 B2 | 5/2018 | Hugenberg et al. | |
| 2002/0111390 A1 | 8/2002 | Lin et al. | |
| 2005/0171231 A1 | 8/2005 | Diggins | |
| 2008/0241520 A1* | 10/2008 | Takahashi | C23C 14/30 428/688 |
| 2009/0189303 A1 | 7/2009 | Diggins et al. | |
| 2010/0227052 A1* | 9/2010 | Carter | C23C 8/08 428/458 |
| 2011/0098724 A1* | 4/2011 | Cichocki | A61L 17/005 424/404 |
| 2013/0334031 A1* | 12/2013 | Lee | C23C 14/083 204/192.1 |
| 2015/0044482 A1 | 2/2015 | Lee et al. | |
| 2018/0036995 A1* | 2/2018 | Okazaki | G02B 1/118 |
| 2019/0302475 A1* | 10/2019 | Zhang | G02B 1/041 |
| 2021/0325693 A1 | 10/2021 | Nomura | |

FOREIGN PATENT DOCUMENTS

| | | | | |
|---|---|---|---|---|
| CN | 205539780 U | 8/2016 | | |
| CN | 106772713 A | 5/2017 | | |
| CN | 108383397 A | 8/2018 | | |
| CN | 210534467 U | 5/2020 | | |
| DE | 19848591 A1 | 10/1999 | | |
| EP | 1392613 A1 | 3/2004 | | |
| EP | 1433814 A1 | 6/2004 | | |
| EP | 1561571 A1 | 8/2005 | | |
| EP | 1602479 A1 | 12/2005 | | |
| EP | 2437084 A1 | 4/2012 | | |
| EP | 2578649 A1 | 4/2013 | | |
| EP | 2801846 A1 | 11/2014 | | |
| JP | 2005025087 A | 1/2005 | | |
| JP | 2010139964 A | 6/2010 | | |
| JP | 2018159860 A | 10/2018 | | |
| JP | 2020106751 A | 7/2020 | | |
| KR | 200375582 Y1 | 2/2005 | | |
| WO | 9417116 A1 | 8/1994 | | |
| WO | 9417166 A1 | 8/1994 | | |
| WO | 03058300 A1 | 7/2003 | | |
| WO | WO-2007101055 A1 * | 9/2007 | ............. | A01N 25/34 |
| WO | 2020082001 A1 | 4/2020 | | |
| WO | 2020138469 A1 | 7/2020 | | |

OTHER PUBLICATIONS

S. Galdiero et al., "Silver Nanoparticles as Potential Antiviral Agents," Molecules, vol. 16, No. 10, pp. 8894-8918, Oct. 2011.
Industrial Norm "Ophthalmic optics—Spectacle lenses—Vocabulary (ISO 13666)," English version DIN EN ISO 13666:2019-02, third edition, 2019.
International Search Report and Written Opinion issued in PCT/EP2021/070730, to which this application claims priority, dated Jan. 18, 2022.
International Preliminary Examination Report issued in PCT/EP2021/070730, which is a counterpart hereof, dated Oct. 10, 2022.

(Continued)

*Primary Examiner* — Travis S Fissel
(74) *Attorney, Agent, or Firm* — Tautz & Schuhmacher LLC; Georg M. Hasselmann

(57) ABSTRACT

A spectacle lens has on at least one surface thereof at least two coatings modified to exhibit an antibacterial effect and/or an antiviral effect. A method of making such a spectacle lens includes dispersing at least one biocidal component in a solvent and/or dissolving at least one biocidal component in a solvent, the dispersed at least one biocidal component and the dissolved at least one biocidal component being different from each other.

10 Claims, No Drawings

(56) References Cited

OTHER PUBLICATIONS

Office Action issued by the Japanese Patent Office in JP 2023-504753, which is a counterpart hereof, dated Jan. 9, 2024, and machine translation thereof.

* cited by examiner

SPECTACLE LENS WITH ANTIBACTERIAL AND/OR ANTIVIRAL PROPERTIES AND METHOD FOR MANUFACTURING THE SAME

CROSS REFERENCE TO RELATED APPLICATIONS

This application is a continuation application of international patent application PCT/EP2021/070730, filed Jul. 23, 2021, designating the U.S. and claiming priority to international patent application PCT/CN2020/104011, filed on Jul. 24, 2020, both of which are hereby incorporated by reference in their entireties.

TECHNICAL FIELD

The present disclosure relates to a spectacle lens comprising at least one antibacterial and/or antiviral coating and a method for manufacturing the same.

BACKGROUND

As mentioned in S. Galdiero et al., Silver Nanoparticles as Potential Antiviral Agents, Molecules 2011,16, 8894-8918, virus infections pose significant global health challenges, especially because of the emergence of resistant viral strains and the adverse side effects associated with prolonged use continue to slow down the application of effective antiviral therapies. Emerging and re-emerging viruses are to be considered a continuing threat to human health because of their ability to adapt to their current host, to switch to a new host and to evolve strategies to escape antiviral measures. Viruses can emerge because of the changes in the host, the environment, or the vector, and new pathogenic viruses can arise in humans from existing human viruses or from animal viruses. Viral diseases, such as the SARS coronavirus, the West Nile virus, the monkey pox virus, the Hantavirus, the Nipah virus, the Hendravirus, the Chikungunya virus, the influenza viruses, recently of avian or swine origin, have become entered in human populations worldwide.

Organic antibacterial agents, photocatalytic materials and metallic compounds have been widely studied and their antibacterial and/or antiviral effect has been demonstrated.

U.S. Pat. No. 5,454,886 A discloses an anti-microbial coating, deposited as thin metallic film on at least one surface of a medical device by physical vapor deposition techniques under conditions which create atomic disorder in the anti-microbial coatings. The atomic disorder, including point defects in a crystal lattice, vacancies, line defects, interstitial atoms, amorphous regions, grain or sub grain boundaries when compared to normal ordered crystalline state found in bulk metal materials or alloys, is according to U.S. Pat. No. 5,454,886 A responsible for the sustained release of metal species, when in contact with an alcohol or a water-based electrolyte including a body fluid or body tissue. To create atomic disorder during the deposition process, for example the temperature of the surface to be coated may be maintained such that the ratio of the substrate temperature to the melting point of the metal in degrees Kelvin is less than about 0.5. Atomic disorder may also be achieved by preparing composite metal materials, i.e., materials which contain at least one anti-microbial metal in a metal matrix which includes atoms or molecules different from the anti-microbial metals. For preparing the composite metal materials at least one anti-microbial metal is co-deposited or sequentially deposited with at least one other inert, biocompatible metal or with an oxide, a nitride, a carbide, a boride, a sulfide, a hydride or a halide of the at least one anti-microbial metal and/or the inert metal. The metals usable in the anti-microbial coatings should have an anti-microbial effect and should be biocompatible. Typically, the anti-microbial coatings have a film thickness of less than 1 μm and not greater than 10 μm.

WO 2019/082001 A1 discloses an air filter comprising an air permeable substrate and an antiviral coating. The antiviral coating, having a thickness from 15 nm to 500 nm, comprises a first glass, ceramic, glass-ceramic material or matrix, typically silica, and a plurality of nanoclusters of a second metallic material, typically copper, zinc or silver. Further, WO 2019/082001 A1 discloses a method for the application of an antiviral coating to a substrate. This method comprises the co-deposition or co-sputtering process of at least a first glass, ceramic, glass-ceramic material or matrix, typically silica, and at least a plurality of nanoclusters of a second metallic material, typically silver, copper or zinc, on the substrate.

CN 106772713 A discloses a spectacle lens comprising an antimicrobial coating layer. The coating of the lens substrate comprises the following layer sequence, beginning from the surface of the lens substrate: a hard coat layer, an antireflective layer comprising two to seven layers, an antibacterial layer, a binding layer, and a top layer. According to CN 106772713 A the binding layer should increase the adhesion between the antibacterial layer and the top layer.

US 2015/0044482 A1 discloses a multi-layer optical coating for a display device having a touch screen panel. The coating structure comprises optionally an anti-reflective coating layer covering the substrate, a base coating layer covering the anti-reflection coating layer or the substrate, respectively, an antibacterial coating layer covering the base coating layer, a protective coating layer covering the antibacterial layer and optionally a super-hydrophobic coating layer or an anti-fingerprint layer covering the protective coating layer. When the antibacterial coating layer is directly formed on the anti-reflective layer, according to US 2015/0044482 A1, the adhesion between the layers may decrease. Further, when the antibacterial coating layer is formed on the base coating layer by vacuum vapor deposition, the protective coating layer may increase the adhesion between the base coating layer, the antibacterial coating layer and the protective coating layer. The antibacterial coating layer may include silver based materials or zinc oxide based materials. As the antibacterial coating layer is formed as an interlayer without direct exposure to an external environment, according to US 2015/0044482 A1 a touch screen panel can consistently have an antibacterial effect.

CN 210534467 U discloses a seawater corrosion-proof antibacterial spectacle lens comprising a substrate, the substrate being coated on the front surface thereof with a hard coating, an antireflection coating, an anti-seawater coating and a waterproof coating. On the back surface, the substrate is coated with a hard coating, an adhesion coating, an antibacterial coating and a waterproof coating. The antibacterial coating is a silver film. The adhesion coating between the hard coating and the antibacterial coating can enhance the adhesion of the antibacterial coating.

WO 2020/138469 A1 discloses a spectacle lens in which high antimicrobial performance and antistatic performance are achieved simultaneously by the same outermost coating of the spectacle lens. The outermost coating contains tungsten oxide particles, tin oxide particles, and silver particles and a binder component such as silicon oxide. The binder component should improve the adhesion of the outermost coating. Typically, the thickness of the outermost coating is in the range of 3 nm to 30 nm. Further typically, the particle size of the tungsten oxide particles, the tin oxide particles and the silver particles is smaller than the thickness of the outermost coating to avoid the formation of protrusions on the outermost surface thereof. The particle size of the tungsten oxide particles, the tin oxide particles and the silver particles is typically from 2 nm to 5 nm. For obtaining a good antibacterial performance, the outermost coating comprises the tungsten oxide particles typically in a range of 0.25 to 0.80 wt.-%. For obtaining a good antistatic performance, the outermost coating comprises the tin oxide particles typically in a range of 0.10 to 0.35 wt.-%. For improving the antibacterial performance, the outermost coating comprises the silver particles typically in a range of 0.025 to 0.10 wt.-%. The outermost coating can be formed by dip coating. Due to the low thickness of the outermost coating, the optical characteristics of an existing coating design should not be deteriorated.

CN 205539780 U discloses an antibacterial layer which is a transparent nano silver gel coating. In this document, an additional coating, i.e., the antibacterial layer, is separately produced and added to an existing coating design. JP 2010139964 A also discloses an anti-bacterial coating provided on to the surface of an already-existing anti-reflection coating. Here, the organic antibacterial substances are separately provided onto the surface of the anti-reflection coating and form a separate coating layer.

KR 200375582 Y1 discloses a glasses or sunglasses, wherein the material of sunglasses made of metal, glass or plastic resin contains nanosilver.

US 2018/0036995 A1 discloses a monolayer film having a surface structure with a plurality of protrusions and depressions. The monolayer film can be a monolayer film with optical functionality, such as an antireflective monolayer film that is durable in antifogging properties and antifouling properties. In contrast to conventional smooth monolayer films having a highly hydrophilic surface, the monolayer film formed of a highly hydrophilic resin and having a surface with a pattern of depressions and protrusions, the depressions of the surface are hard to contact with an object, i.e., hydrophilic groups are substantially not lost, and a highly hydrophilic state can be maintained. The composition forming the monolayer film may contain additives, for example, to impart bactericidal properties and antibacterial properties.

SUMMARY

It is therefore an objective of the present disclosure to provide a spectacle lens effective against the remaining and spreading of bacteria and/or viruses on at least one of the spectacle lens surfaces, especially on the front surface and/or on the back surface of the spectacle lens, thereby avoiding the addition of a further coating into an existing coating stack or an existing coating design. A further objective is to provide an efficient method of manufacturing a spectacle lens being effective against the remaining and spreading of bacteria and/or viruses on at least one of the spectacle lens surfaces, especially of the front surface and/or on the back surface of the spectacle lens.

This problem is solved by a spectacle lens having on at least one surface thereof at least two coatings modified to exhibit an antibacterial effect and/or an antiviral effect, and a method for producing a spectacle lens including modifying at least one anti-fog coating with a biocidal component by diffusion of the biocidal component into the anti-fog coating.

Exemplary embodiments, which might be realized in an isolated fashion or in any arbitrary combination, are discussed below.

As spectacle lens substrate an uncoated or precoated blank, the blank being defined in section 3.8.1 of DIN EN ISO 13666:2019-12 as piece of optical material with one optically finished surface for the making of a lens; an uncoated or precoated single-vision blank, the single-vision blank being defined in section 3.8.2 of DIN EN ISO 13666: 2019-12 as blank with the finished surface having a single nominal surface power; an uncoated or precoated multifocal blank, the multifocal blank being defined in section 3.8.3 of DIN EN ISO 13666:2019-12 as blank with the finished surface having two or more visibly divided portions of different dioptric powers or focal powers; an uncoated or precoated progressive-power blank, the progressive-power blank being defined in section 3.8.5 of DIN EN ISO 13666: 2019-12 as power-variation blank where the finished surface is a progressive-power surface; an uncoated or precoated degressive-power blank, the degressive-power blank being defined in section 3.8.6 of DIN EN ISO 13666:2019-12 as power-variation blank where the finished surface is a degressive-power surface; an uncoated or precoated finished lens, the finished lens being defined in section 3.8.7 of DIN EN ISO 13666:2019-12 as lens of which both sides have their final optical surface; an uncoated or precoated uncut lens, the uncut lens being defined in section 3.8.8 of DIN EN ISO 13666:2019-12 as finished lens prior to edging; or an uncoated or precoated edged lens, the edged lens being defined in section 3.8.9 of DIN EN ISO 13666:2019-12 as finished lens edged to final size and shape may be used. If one of the before mentioned blanks is precoated, the respective finished surface comprises at least one coating. If one of the before mentioned lenses is precoated, at least one side thereof comprises at least one coating.

Typically, the spectacle lens substrate is an uncoated or precoated finished lens or an uncoated or precoated uncut lens.

The uncoated or precoated spectacle lens substrate may be classified as afocal lens with nominally zero dioptric power according to section 3.6.3 of DIN EN ISO 13666:2019-12 or as corrective lens, i.e., as a lens with dioptric power according to section 3.5.3 of DIN EN ISO 13666:2019-12.

Further, the uncoated or precoated spectacle lens substrate may be classified as a single-vision lens according to section 3.7.1 of DIN EN ISO 13666:2019-12; as a position-specific single-vision lens according to section 3.7.2 of DIN EN ISO 13666:2019-12; as a multifocal lens according to section 3.7.3 of DIN EN ISO 13666:2019-12; as a bifocal lens according to section 3.7.4 of DIN EN ISO 13666:2019-12; as a trifocal lens according to section 3.7.5 of DIN EN ISO 13666:2019-12; as a fused multifocal lens according to section 3.7.6 of DIN EN ISO 13666:2019-12; as a power-variation lens according to section 3.7.7 of DIN EN ISO 13666:2019-12; as a progressive-power lens according to section 3.7.8 of DIN EN ISO 13666:2019-12; or as a degressive-power lens according to section 3.7.9 of DIN EN ISO 13666:2019-12.

Further, the uncoated or precoated spectacle lens substrate may be classified as protective lens according to section 3.5.4 of DIN EN ISO 13666:2019-12; as absorptive lens according to section 3.5.5 of DIN EN ISO 13666:2019-12; as tinted lens according to section 3.5.6 of DIN EN ISO 13666:2019-12; as clear lens according to section 3.5.7 of DIN EN ISO 13666:2019 12; as uniformly tinted lens according to section 3.5.8 of DIN EN ISO 13666:2019-12; a gradient-tinted lens according to section 3.5.9 of DIN EN ISO 13666:2019-12; as double gradient-tinted lens according to section 3.5.10; as photochromic lens according to section 3.5.11 of DIN EN ISO 13666:2019-12; or as polarizing lens according to section 3.5.12 of DIN EN ISO 13666:2019-12.

The uncoated or precoated spectacle lens substrate is typically based on an optical material, the optical material being defined according to section 3.3.1 of DIN EN ISO 13666:2019-12 as transparent material capable of being manufactured into optical components. The uncoated or precoated spectacle lens substrate may be made of mineral glass according to section 3.3.1 of DIN EN ISO 13666:2019-12 and/or of an organic hard resin such as a thermosetting hard resin according to section 3.3.3 of DIN EN ISO 13666:2019-12; a thermoplastic hard resin according to section 3.3.4 of DIN EN ISO 13666:2019-12; or a photochromic material according to section 3.3.5 of DIN EN ISO 13666:2019-12.

Typically, the uncoated or precoated spectacle lens substrate is based on one of the optical materials mentioned in Table 1, particularly preferred on one of the organic hard resins.

TABLE 1

Examples of optical materials for blanks or lenses

| Trade name | Optical material | Average refractive index $n_D$* | Abbe number $v_D$* |
|---|---|---|---|
| CR-39, CR-330, CR-607, CR-630, RAV 700, RAV 7NG, RAV 7AT, RAV 710, RAV 713, RAV 720 | Polyallyldiglycol carbonate ((P)ADC) | 1.500 | 56 |
| RAVolution | Polyurea/Polyurethane | 1.500 | 54 |
| Trivex | Polyurea/Polyurethane | 1.530 | 45 |
| Panlite, Lexan, Makrolon | Polycarbonate (PC) | 1.590 | 29 |
| MR-6 | Polythiourethane | 1.598 | |
| MR-8 | Polythiourethane | 1.598 | 41 |
| MR-7 | Polythiourethane | 1.664 | 32 |
| MR-10 | Polythiourethane | 1.666 | 32 |
| MR-174 | Polyepisulfide | 1.738 | 32 |
| MGC 1.76 | Polyepisulfide | 1.76 | 30 |
| Spectralite | Urethane/Methacrylate | 1.54 | |
| Mineral 1.5 | | 1.525 | 58 |
| Mineral 1.6 | | 1.604 | 44 |
| Mineral 1.7 | | 1.701 | 39.2 |
| Mineral 1.8 | | 1.802 | 34.4 |
| Mineral 1.9 | | 1.885 | 30 |

*Based on sodium D line

In case the uncoated or precoated spectacle lens substrate is made of mineral glass and of an organic hard resin such as a thermosetting hard resin or a thermoplastic hard resin, the mineral glass typically comprises at least one ultrathin lens. In this case, the organic hard resin may comprise an uncoated or precoated blank, an uncoated or precoated single-vision blank, an uncoated or precoated multifocal blank, an uncoated or precoated power-variation blank, an uncoated or precoated progressive-power blank, an uncoated or precoated degressive-power blank, an uncoated or precoated finished lens, an uncoated or precoated uncut lens; or an uncoated or precoated edged lens, each blank comprising on at least the finished surface thereof at least one ultrathin lens and each finished lens comprising on at least one side thereof at least one ultrathin lens. After surfacing the opposite surface of the respective blank, this opposite surface may comprise at least one ultrathin lens as well, the at least one ultrathin lens being identical or different to the other one in relation to the glass composition, to the average thickness and/or to the shape. Further, the spectacle lens substrate may be made of at least two ultrathin lenses comprising a plastic film in-between. The at least one ultrathin lens may be based on various glass compositions, for example, be borosilicate glass, aluminium borosilicate glass or alkali-free borosilicate glass. Typically, the at least one ultrathin lens is based on a borosilicate glass or an aluminium borosilicate glass. The at least one ultrathin lens typically has an average thickness in a range from 10 µm to 1000 µm, further typically from a range from 13 µm to 760 µm, further typically from a range from 16 µm to 510 µm, more typically from a range from 18 µm to 390 µm and most typically from a range from 19 µm to 230 µm. Especially typically, the at least one ultrathin lens has an average thickness in a range from 21 µm to 121 µm or from 75 µm to 140 µm or from 80 µm to 220 µm. The average thickness of the at least one ultrathin lens is understood to mean the arithmetic average. Below an average thickness of 10 µm, the at least one ultrathin lens is too mechanically unstable to be able to be combined with at least one of the surfaces of at least one of the organic hard resin components mentioned before. Above an average thickness of 1000 µm, the at least one ultrathin lens can lead to spectacle lenses that would have too great an edge thickness or too great a middle thickness of the spectacle lens. The average thickness of the at least one ultrathin lens is measured typically with the Filmetrics F10-HC instrument from Filmetrics Inc. The at least one ultrathin lens typically has a surface roughness Ra of <1 nm. Further typically, the surface roughness Ra of the at least one ultrathin lens is within a range from 0.1 nm to 0.8 nm, more typically within a range from 0.3 nm to 0.7 nm and most typically within a range from 0.4 nm to 0.6 nm. The aforementioned values for surface roughness Ra are each based on the front surface and the back surface of the at least one ultrathin lens of an unformed, planar ultrathin lens. After forming, the aforementioned values are in each case applicable typically to that surface of the ultrathin lens that has not been brought into contact with the shaped body. Depending on the shaped body used for forming, the aforementioned values may also be applicable to the surface of the at least one ultrathin lens that was in contact with the shaped body used for forming. The surface roughness Ra of the at least one ultrathin lens is typically determined by means of white light interferometry, typically with the NewView 7100 instrument from Zygo Corporation. Ultrathin lenses are commercially available, for example, under the names: D 263 T eco, D 263 LA eco, D 263 M, AF 32 eco, SCHOTT AS 87 eco, B 270 I, each from Schott AG, or Corning Willow Glass or Corning Gorilla Glass, each from Corning Inc.

In case the spectacle lens substrate is made of an organic hard resin, typically at least one of the finished surfaces of the spectacle lens substrate comprises at least one hard coating, further typically both finished surfaces of the spectacle lens substrate comprise at least one hard coating. The at least one finished surface of the spectacle lens substrate may be uncoated or precoated. The at least one hard coating typically has an average thickness in a range of from 0.6 µm to 10 µm, further typically in a range of from 0.8 µm to 6.6 µm, more typically in a range of from 1.1 µm to 5.8 µm and most typically in a range of from 1.6 µm to 4.9 µm. The average thickness of the at least one hard coating is typically determined by the measurement of the spectral reflectivity and/or the spectral transmissivity. The average thickness is the arithmetic average of the physical thickness of the at least one hard coating measured in at least three positions of the at least one hard coating after application and curing. Typically, an optical spectrometer, such as one of the devices F20, F10-HC or F10-AR of the company Filmetrics Inc., typically the device F10-HC, is used to determine the average thickness of the at least one hard coating. Illumination of a spectacle lens comprising a spectacle lens substrate and at least one hard coating with white light causes interference spectra dependent on the physical thickness of the at least one hard coating and the respective refractive index thereof. The path difference corresponds exactly to the multiple of the optical thickness. The average thickness is typically calculated with Fast Fourier Transformation (FFT). Alternatively, the average thickness of the at least one hard coating may be determined with at least one scanning electron microscope photograph of a cross-section of the spectacle lens comprising a spectacle lens substrate and at least one hard coating. The thickness of the at least one hard coating is determined in at least three positions and the arithmetic average is formed thereof.

The at least one hard coating may be based on at least one of the hard coating compositions disclosed in US 2005/0171231 A1, in US 2009/0189303 A1 or in US 2002/0111390 A1.

The at least one hard coating typically is based on at least one hard coating composition disclosed in EP 2 578 649 A1, particularly in EP 2 578 649 A1, claim 1. The at least one hard coating composition configured to produce the at least one hard coating typically comprises A) a) at least one silane derivative of the formula (I) $Si(OR^1)(OR^2)(OR^3)(OR^4)$, wherein $R^1$, $R^2$, $R^3$ and $R^4$, which may be the same or different, are selected from an alkyl, an acyl, an alkyleneacyl, a cycloalkyl, an aryl or an alkylenearyl group, each of which may optionally be substituted, and/or
 b) at least one hydrolysis product of the at least one silane derivative of the formula (I), and/or
 c) at least one condensation product of the at least one silane derivative of the formula (I), and/or
 d) any mixture of the components a) to c) thereof;
B) a) at least one silane derivative of the formula (II) $R^6R^7_{3-n}Si(OR^5)_n$, in which $R^5$ is selected from an alkyl, an acyl, an alkyleneacyl, a cycloalkyl, an aryl or an alkylenearyl group, each of which may optionally be substituted, $R^6$ is an organic radical containing at least one epoxide group, $R^7$ is selected from an alkyl, a cycloalkyl, an aryl or an alkylenearyl group, each of which may optionally be substituted, n is 2 or 3; and/or
 b) at least one hydrolysis product of the at least one silane derivative of the formula (II), and/or
 c) at least one condensation product of the at least one silane derivative of the formula (II), and/or any mixture of the components a) to c) thereof;
C) at least one colloidal inorganic oxide, hydroxide, oxide hydrate, fluoride and/or oxyfluoride;
D) at least one epoxide compound having at least two epoxide groups; and
E) at least one catalyst system comprising at least one Lewis acid and at least one thermolatent Lewis acid-base adduct.

The term "at least one hydrolysis product" of the at least one silane derivative of the formula (I) or (II) respectively expresses the fact that the at least one silane derivative of the formula (I) or of the formula (II) each has already been at least partly hydrolyzed to form silanol groups.

The term "at least one condensation product" of the at least one silane derivative of the formula (I) or of the formula (II) respectively expresses the fact that a certain degree of crosslinking has also already taken place through condensation reaction of the silanol groups.

The at least one silane derivative of the formula (I) may be selected from tetramethoxysilane, tetraethoxysilane, tetrapropoxysilane, tetraisopropoxysilane, tetrabutoxysilane, tetrai sobutoxysilane, tetrakis(methoxyethoxy)silane, tetrakis(methoxypropoxy)silane, tetrakis(ethoxyethoxy) silane, tetrakis(methoxyethoxyethoxy)silane, trimethoxyethoxysilane, dimethoxydi ethoxysilane or mixtures thereof.

The at least one silane derivative of the formula (II) may be selected from 3-glycidoxy-methyltrimethoxysilane, 3-glycidoxypropyltrihydroxysilane, 3-glycidoxypropyldimethyl-hydroxysilane, 3-glycidoxypropyldimethylethoxysilane, 3-glycidoxypropylmethyldiethoxysilane, 3-glycidoxypropyltrimethoxysilane, 3-glycidoxypropyltriethoxysilane, 3-glycidoxypropyldimethoxymethylsilane, 3-glycidoxypropyldiethoxymethylsilane, 2-(3,4-epoxycyclohexyl)ethyltrimethoxysilane or mixtures thereof.

The at least one colloidal inorganic oxide may be selected from silicon dioxide, titanium dioxide, zirconium dioxide, tin dioxide, antimony oxide, aluminum oxide or mixtures thereof.

The mean particle diameter of the at least one colloidal inorganic oxide, hydroxide, fluoride or oxyfluoride is typically selected such that the transparency of the at least one hard coating is not affected. Typically, the at least one colloidal inorganic oxide, hydroxide, oxide hydrate, fluoride and/or oxyfluoride has a mean particle diameter in the range of from 2 nm to 150 nm, even more typically of from 2 nm to 70 nm. The mean particle diameter is determined typically by means of dynamic light scattering. The at least one colloidal inorganic oxide, hydroxide, oxide hydrate, fluoride or oxyfluoride contributes to an increase in scratch resistance through incorporation into the existing network. In addition, selection of at least one colloidal inorganic oxide, hydroxide, oxide hydrate, fluoride or oxyfluoride allows the refractive index of the at least one hard coating to be matched to the refractive index of the uncoated spectacle lens substrate or to a precoating of the spectacle lens substrate.

The at least one epoxide compound having at least two epoxide groups is typically a polyglycidyl ether compound, more typically a diglycidyl ether or triglycidyl ether compound. For example, as at least one epoxide compound comprising at least two epoxide compounds digylcidyl ether, ethylenglycoldiglycidyl ether, propylenglycoldiglycolglycidyl ether, 1,4-butandioldiglycidyl ether, 1,6-hexandioldiglycidyl ether, trimethylolpropantriglycidyl ether, triglycidylglycerin and/or trimethylolethantriglycidylether may be used in the coating composition. Typically, the at least epoxide compound comprises trimethylolpropantriglycidyl ether, butandioldiglycidyl ether and/or 1,6-hexandioldiglycidyl ether.

The at least one catalyst system comprising at least one Lewis acid and at least one thermolatent Lewis acid-base adduct enables very homogeneous crosslinking and hence also constantly high strength over the entire layer thickness of the at least one hard coating. The term "Lewis acid" relates to an electrophilic electron pair acceptor compound, the term "Lewis base" is understood to mean an electron pair donor compound. The at least one Lewis acid is typically one which have catalytic activity even at relatively low temperatures, for example at room temperature. The at least one Lewis acid may be selected from ammonium salts, metal salts, especially of metals from one of groups 1 (i.e., alkali metal salts), 2 (i.e., alkaline earth metal salts) or 13 (typically Al or B) of the periodic table of the elements, halides of an element of group 13 of the periodic table of the elements (especially $AlX_3$ or $BX_3$, where X is chlorine or fluorine), organic sulphonic acids and amine salts thereof, alkali metal or alkaline earth metal salts, for example alkali metal or alkaline earth metal salts of carboxylic acids, fluoride salts, organotin compounds, or a mixture thereof. Preferred metal salts of metals from one of the groups 1, 2 and 13 of the periodic table of the elements are, for example, perchlorates or carboxylates. Preferred Lewis acids are, for example, ammonium perchlorate, magnesium perchlorate, sulphonic acids and salts thereof, such as trifluoromethanesulphonic acid and salts thereof.

The at least one Lewis acid-base adduct is understood to mean a compound which has catalytic activity with regard to the chemical reaction in question only at relatively high temperatures, while it is essentially still catalytically inactive at room temperature. Only through the supply of sufficient thermal energy is a thermolatent catalyst compound converted to a catalytically active state.

The at least one silane derivative of the formula (I) and/or the at least one hydrolysis product of the silane derivative of the formula (I) and/or the at least one condensation product of the silane derivative of the formula (I) is/are typically present in the at least one hard coating composition in an amount of 5% by weight to 50% by weight, more typically of 6% by weight to 20% by weight, each based on the total weight of the at least one hard coating composition.

The amounts given before apply with regard to the at least one silane derivative of the formula (I), with regard to the at least one hydrolysis product of the formula (I), with regard to the at least one condensation product of the formula (I) or with regard to any mixture thereof. The amounts given before apply as well with regard to a mixture of silane derivatives of the formula (I), with regard to a mixture of hydrolysis products of the at least one silane derivative of the formula (I), with regard to a mixture of condensation products of the at least one silane derivative of the formula (I) or with regard to any mixture thereof.

The at least one silane derivative of the formula (II) and/or the at least one hydrolysis product of the silane derivative of the formula (II) and/or the at least one condensation product of the silane derivative of the formula (II) is/are typically present in the at least one hard coating composition in an amount of 5% by weight to 50% by weight, more typically of 6% by weight to 20% by weight, each based on the total weight of the at least one hard coating composition. The amounts given before apply with regard to the at least one silane derivative of the formula (II), with regard to the at least one hydrolysis product of the formula (II), with regard to the at least one condensation product of the formula (II) or with regard to any mixture thereof. The amounts given before apply as well with regard to a mixture of silane derivatives of the formula (II), with regard to a mixture of hydrolysis products of the at least one silane derivative of the formula (II), with regard to a mixture of condensation products of the at least one silane derivative of the formula (II) or with regard to any mixture thereof.

The weight ratio of the at least one silane derivative of the formula (I), the at least one hydrolysis product of the silane derivative of the formula (I) and/or the at least one condensation product of the silane derivative of the formula (I) relative to the at least one silane derivative of the silane derivative of the formula (II), the at least one hydrolysis product of the silane derivative of the formula (II) and/or the at least one condensation product of the silane derivative of the formula (II) is typically in the range of from 95/5 to 5/95, more typically in the range of from 70/30 to 30/70, and most typically in the range of from 60/40 to 40/60.

The at least one colloidal inorganic oxide, hydroxide, fluoride and/or oxyfluoride is/are present in the at least one hard coating composition typically in an amount of 5% by weight to 50% by weight, more typically of 6% by weight to 25% by weight, each based on the total weight of the at least one hard coating composition. The amounts mentioned before apply for one type of colloidal oxide, one type of hydroxide, one type of fluoride, one type of oxyfluoride, for a mixture thereof, for a mixture of different colloidal oxides, a mixture of different colloidal hydroxides, a mixture of different colloidal fluorides, a mixture of different colloidal oxyfluorides or for any mixture thereof. The mixture of different colloidal oxides, hydroxides, fluorides or oxyfluorides may for example comprise one type of each in different particle sizes or different types of each in the same or in a different particle size.

The at least one epoxide compound having at least two epoxide groups is present in the at least one hard coating composition typically in an amount of 0.1% by weight to 10% by weight, more typically of 0.5% by weight to 10% by weight, each based on the total weight of the at least one hard coating composition. The amounts given before apply with regard to one type of epoxide compound or to a mixture of different types of epoxide compounds.

The at least one catalyst system is present in the at least one hard coating composition typically in an amount in the range from 0.01% by weight to 5% by weight, more typically in the range from 0.1% by weight to 3% by weight, each based on the total weight of the hard coating composition.

The weight ratio of at least one Lewis acid to the at least one thermolatent Lewis acid-base adduct is typically in the range from 20/1 to 1/2, more typically from 5/1 to 2/1.

The hard coating composition further comprises at least one solvent comprising at least one alcohol, at least one ether, at least one ester or water. In case the at least one solvent comprises two different solvents, the boiling point of the first solvent S1 and the boiling point of the second solvent S2 is either S1/S2≥1.2 or S1/S2≤0.8. Further, in case the at least one solvent comprises two different solvents, the weight ratio of the first solvent to the second solvent is typically in the range of from 5 to 0.01, more typically in the range of from 2 to 0.2.

Typically water is present in an amount of 2% by weight to 15% by weight, based on the total weight of the hard coating composition.

The components of the coating composition resulting in a hard coating are used in that they add to 100% by weight based on the total weight of the coating composition.

The coating composition mentioned before resulting in at least one hard coating is typically applied to at least one of the uncoated or precoated surfaces of the spectacle lens substrate, typically on both surfaces of the spectacle lens substrate by dip coating or by spin coating.

The use of the above mentioned coating composition comprising the components (A) to (E), i.e., at least one first silane derivative of formula (I), at least one hydrolysis product and/or at least one condensation product thereof, at least one second silane derivative of formula (II), at least one hydrolysis product and/or at least one condensation product thereof, at least one colloidal inorganic oxide, hydroxide, fluoride and/or oxyfluoride, at least one epoxide compound and at least one catalyst system, enables the production of at least one hard coating having very good adhesive strength on at least one surface of different types of uncoated or precoated spectacle lens substrates, having a high hardness, being of high scratch resistance and showing a low tendency to crack formation on at least one surface of different types of uncoated or precoated spectacle lens substrates.

Alternatively or additionally to the before mentioned at least one hard coating composition resulting in at least one hard coating, at least one of the finished surfaces of the uncoated or precoated spectacle lens substrate, typically both finished surfaces of the uncoated of precoated spectacle lens substrate, comprises at least one hard coating which is typically based on at least one hard coating composition comprising A) a) at least one silane derivative of the formula (III) $R^1R^2_{3-n}Si(OR^3)_n$, wherein $R^1$ comprises an alkyl group, a cyclo alkyl group, an acyl group, an aryl group or a hetero aryl group, each of which may be substituted, $R^2$ is an organic rest comprising an epoxide group, $R^3$ comprises an alkyl group, a cyclo alkyl group, an aryl group or a hetero aryl group, each of which may be substituted, n=2 or 3, and/or
b) at least one hydrolysis product of the silane derivative of the formula (III), and/or
c) at least one condensation product of the silane derivative of the formula (III), and/or
d) any mixture of components a) to c);
B) at least one colloidal inorganic oxide, hydroxide, oxide hydrate, fluoride and/or oxyfluoride;
C) at least one epoxy component comprising at least two epoxy groups; and
D) at least one catalyst system comprising at least one Lewis acid and at least one thermolatent Lewis base-adduct.

The term "at least one hydrolysis product" of the at least one silane derivative of the formula (III) expresses the fact that the at least one silane derivative of the formula (III) has already been at least partly hydrolyzed to form silanol groups.

The term "at least one condensation product" of the at least one silane derivative of the formula (III) expresses the fact that a certain degree of crosslinking has also already taken place through condensation reaction of the silanol groups.

The at least one silane derivative of the formula (III) and/or the at least one hydrolysis product of the silane derivative of the formula (III) and/or the at least one condensation product of the at least one silane derivative of the formula (III) and/or any mixture thereof is/are present in the at least one hard coating composition in a total amount in the range typically of from 9% by weight to 81% by weight, further typically of from 13% by weight to 76% by weight, more typically of from 19% by weight and most typically of from 23% by weight to 66% by weight, each based on the total weight of the at least one coating composition. The amounts given before apply with regard to the at least one silane derivative of the formula (III), with regard to the at least one hydrolysis product of the formula (III), with regard to the at least one condensation of the formula (III) or with regard to any mixture thereof. The amounts given before apply as well with regard to a mixture of silane derivatives of the formula (III), with regard to a mixture of hydrolysis products of the at least one silane derivative of the formula (III), with regard to a mixture of condensation products of the at least one silane derivative of the formula (III) or with regard to any mixture thereof.

The at least one colloidal inorganic oxide, hydroxide, oxide hydrate, fluoride and/or oxyfluoride is/are present in the at least one hard coating composition in a total amount in the range typically of from 3% by weight to 60% by weight, further typically of from 6% by weight to 58% by weight, more typically of from 9% by weight to 57% by weight and most typically of from 13% by weight to 55% by weight, each based on the total weight of the at least one hard coating composition. The amounts given before apply with regard to one type of colloidal inorganic oxide, one type of colloidal inorganic hydroxide, one type of colloidal inorganic oxide hydrate, one type of colloidal inorganic fluoride, one type of colloidal inorganic oxyfluoride and any mixture thereof. The amounts given before apply as well with regard to a mixture of different colloidal inorganic oxides, a mixture of different colloidal inorganic hydroxides, a mixture of different colloidal inorganic oxide hydrates, a mixture of different colloidal inorganic fluorides, a mixture of different colloidal inorganic oxyfluorides or any mixture thereof. The mentioned mixtures may include each different particles sizes or different types of colloidal inorganic oxides, hydroxides, oxide hydrates, fluorides and/or oxyfluorides.

The at least one epoxide compound comprising at least two epoxide groups is present in the at least one hard coating composition in an amount in the range typically of from 0.01% by weight to 14% by weight, further typically of from 0.07% by weight to 11% by weight, more typically of from 0.1% by weight to 6% by weight and most typically of from 0.2% by weight to 13% by weight, each based on the total weight of the at least one hard coating composition. The amount given before apply with regard to one type of epoxide compound as well as with regard to a mixture of different epoxide compounds.

The at least one catalyst system comprising at least one Lewis acid and at least one thermolatent Lewis base-adduct is present in the at least one hard coating composition in an amount in the range typically from 0.04% by weight to 4% by weight, further typically from 0.1% by weight to 3% by weight, more typically from 0.2% by weight to 2% by weight and most typically from 0.3% by weight to 1% by weight, each based on the total weight of the at least one hard coating composition. The weight ratio of the at least one Lewis acid to the at least one thermolatent Lewis base-adduct is typically in a range from 20:1 to 2:1, further typically from 18:1 to 1:2, more typically from 13:1 to 1:1 and most typically from 6:1 to 1:1.

The at least one hard coating composition may comprise at least one organic solvent and/or water. The components of the at least one hard coating composition resulting in at least one hard coating are used in that they add to 100% by weight based on the total weight of the at least one hard coating composition.

As at least one silane derivate of the formula (III) 3-glycidoxymethyl-trimethoxysilane, 3-glycidoxypropyltrihydroxysilane, 3-glycidoxypropyl-dimethylhydroxysilane, 3-glycidoxypropyldimethylethoxysilane, 3-glycidoxypropylmethyldiethoxysilane, 3-glycidoxypropyltrimethoxysilane, 3-glycidoxypropyl-triethoxysilane, 3-glycidoxypropyldimethoxymethyl-silane, 3-glycidoxypropyldiethoxymethyl silane and/or 2-(3,4-epoxycyclohexyl)ethyltrimethoxysilane, for example, may be used in the at least one hard coating composition. Typically, 3-glycidoxypropyltrimethoxysilane and/or 3-glycidoxy-propyltriethoxysilane is/are used as silane derivative of the formula (III).

The at least one colloidal inorganic oxide, hydroxide and/or oxide hydrate may be a metal oxide, metal hydroxide and/or metal oxide hydrate, where the metal ions of the metal oxide, metal hydroxide and/or metal oxide hydrate comprise or are metals of titanium, typically $TiO_2$, of silicon, typically $SiO_2$, of zirconium, typically $ZrO_2$, of tin, typically $SnO_2$, of antimony, typically $Sb_2O_3$, of aluminum, typically $Al_2O_3$ or AlO(OH) and/or mixed oxides and/or mixtures thereof. Typically, the colloidal inorganic oxide, hydroxide, oxide hydrate is a metal oxide, metal hydroxide and/or metal oxide hydrate, wherein the metal ions of the metal oxide, metal hydroxide and/or metal oxide hydrate comprise or are metals of titanium, silicon, zirconium or mixtures thereof, further typically of silicon. Further typically, the at least one colloidal inorganic oxide, hydroxide and/or oxide hydrate form core-shell particles. In such core-shell particles the core comprises typically a metal oxide, metal hydroxide and/or metal oxide hydrate, wherein the metal ions of the metal oxide, metal hydroxide and/or metal oxide hydrate comprise or are metals of titanium, typically $TiO_2$, and/or of zirconium, typically $ZrO_2$ and the shell comprises typically a metal oxide, metal hydroxide and/or metal oxide hydrate, wherein the metal ions of the metal oxide, metal hydroxide and/or metal oxide hydrate comprise or are silicon, typically $SiO_2$. As colloidal inorganic fluoride magnesium fluoride may be used. The at least one colloidal oxide, hydroxide, oxide hydrate, fluoride and/or oxyfluoride has a mean particle size in the range typically from 3 nm to 70 nm, further typically from 6 nm to 64 nm, more typically from 8 nm to 56 nm and most typically from 9 nm to 52 nm.

As at least one epoxide compound comprising at least two epoxide compounds digylcidyl ether, ethylenglycoldiglycidyl ether, propylenglycoldiglycolglycidyl ether, 1,4-butandioldiglycidyl ether, 1,6-hexandioldiglycidyl ether, trimethylolpropantriglycidyl ether, triglycidylglycerin and/or trimethylolethantriglycidylether for example may be used in the at least one hard coating composition. Typically, the at least epoxide compound comprises trimethylolpropantriglycidyl ether, butandioldiglycidyl ether and/or 1,6-hexandioldiglycidyl ether.

As at least one Lewis acid ammonium perchlorate, magnesium perchlorate, sulfonic acids and/or salts of sulfonic acids, such as trifluormethane sulfonic acid and/or salts thereof, for example, may be used in the at least one catalyst system.

As at least one Lewis base-adduct a metal complex compound, such as aluminum acetylacetonate, iron acetylacetonate and/or zinc acetylacetonate, for example may be used in the at least one catalyst system.

The use of the at least one hard coating composition comprising the components (A) to (D), i.e., at least one silane derivative of the formula (III), at least one hydrolysis product and/or at least one condensation product thereof, least one colloidal inorganic oxide, hydroxide, oxide hydrate, fluoride and/or oxyfluoride, at least one epoxide compound and at least one catalyst system, enables the production of at least one hard coating having very good adhesive strength on at least one surface of different types of uncoated or precoated spectacle lens substrates, having a high hardness, being of high scratch resistance and showing a low tendency to crack formation on at least one surface of different types of uncoated or precoated spectacle lens substrates.

The at least one hard coating composition resulting in at least one hard coating is typically applied to at least one uncoated or precoated surface of the spectacle lens substrate, further typically to both surfaces thereof, by dip coating or by spin coating.

In case the spectacle lens substrate is made of an organic hard resin, typically at least one of the finished surfaces of the spectacle lens substrate is coated with at least one hard coating as described above and at least one primer coating. If the spectacle lens comprises at least one hard coating and at least one primer coating, the at least one primer coating is the coating that is located next, but not necessarily adjacent, to the at least one finished surface of the spectacle lens substrate to be coated. Phrased differently, if at least one of the finished surfaces of the spectacle lens substrate is coated with at least one primer coating and with at least one hard coating, typically the at least one hard coating is furthest away from the to be coated surface of the spectacle lens substrate. The at least one finished surface of the spectacle lens substrate may be uncoated or precoated. Further typically, both surfaces of the uncoated of precoated spectacle lens substrate comprise at least one primer coating.

The average thickness of the at least one primer coating typically lies in a range of from 300 nm to 1200 nm, further typically in a range of from 340 nm to 1150 nm, further typically in a range of from 390 nm to 1120 nm, more typically in a range of from 440 nm to 1110 nm and most typically in a range of from 470 nm to 1100 nm. The average thickness is the arithmetic average of the physical thickness of the at least one primer coating measured in at least three positions of the at least one primer coating after application and curing. Typically, the average thickness of the at least one primer coating is determined by the measurement of the spectral reflectivity and/or the spectral transmissivity. Typically, an optical spectrometer, such as one of the devices F20, F10-HC or F10-AR of the company Filmetrics Inc., typically the device F10-HC, is used to determine the average thickness of the at least one primer coating. Illumination of a spectacle lens comprising a spectacle lens substrate and at least one primer coating with white light causes interference spectra dependent on the physical thickness of the at least one primer coating and the respective refractive index thereof. The path difference corresponds exactly to the multiple of the optical thickness. The average thickness is typically calculated with Fast Fourier Transformation (FFT). Alternatively, the average thickness of the at least one primer coating may be determined with at least one scanning electron microscope photograph of a cross-section of the spectacle lens comprising a spectacle lens substrate and at least one primer coating. The thickness of the at least one primer coating is determined in at least three positions and the arithmetic average is formed thereof.

The at least one primer coating may typically be based on at least one primer coating composition comprising
  i) at least one aqueous aliphatic, cycloaliphatic, aromatic or heteroaromatic polyurethane dispersion, at least one aqueous aliphatic, cycloaliphatic, aromatic or heteroaromatic polyurea dispersion, at least one aqueous aliphatic, cycloaliphatic, aromatic or heteroaromatic polyurethane-polyurea dispersion and/or at least one aqueous aliphatic, cycloaliphatic, aromatic or heteroaromatic polyester dispersion, typically at least one aqueous aliphatic polyurethane dispersion or at least one aqueous aliphatic polyester dispersion and more typically at least one aqueous aliphatic polyurethane dispersion,
  ii) at least one solvent,
  iii) optionally at least one additive.

The at least one aqueous aliphatic, cycloaliphatic, aromatic or heteroaromatic polyurethane dispersion, at least one aqueous aliphatic, cycloaliphatic, aromatic or heteroaromatic polyurea dispersion, at least one aqueous aliphatic, cycloaliphatic, aromatic or heteroaromatic polyurethane-polyurea dispersion and/or at least one aqueous aliphatic, cycloaliphatic, aromatic or heteroaromatic polyester dispersion is/are present in the at least one primer coating composition in a total amount selected from a range typically of from 2% by weight to 38% by weight, further typically of from 4% by weight to 34% by weight, further typically of from 5% by weight to 28% by weight, more typically of from 6% by weight to 25% by weight and most typically of from 7% by weight to 21% by weight, each based on the total weight of the at least one primer coating composition. The total amount comprises the amount of only one of the dispersions mentioned before or a mixture thereof.

The at least one primer coating composition comprises typically at least one aqueous polyurethane dispersion, wherein the polyurethane comprises a polyester unit as a spacer or the polyurethane dispersion is a polyurethane-polyurea dispersion, characterized by the occurrence of both urethane and urea groups in a macromolecular chain of the polyurethane-polyurea. Such polyurethane dispersions are described for example in WO 94/17116 A1, in particular in WO 94/17116 A1, page 7, lines 11 to 33. The aqueous polyurethane dispersion may be blended with anionically stabilized acrylic emulsions, as described in WO 94/17116 A1, in particular in WO 94/17116 A1, page 7, lines 33 to 35.

The at least one solvent is present in the at least one primer coating composition in an amount selected from a range typically of from 68% by weight to 99% by weight, further typically of from 69% by weight to 98% by weight, more typically of from 81% by weight to 97% by weight and most typically of from 89% by weight to 93% by weight, each based on the total weight of the at least one primer coating composition. The amounts mentioned before apply with regard to one type of solvent as well as with regard to a mixture of different solvents.

As at least one solvent typically at least one organic solvent with a low boiling point of <100° C. under normal pressure and at least one organic solvent with a middle boiling of 100° C. to 150° C. under normal pressure may be used. As at least one organic solvent with a low boiling point methanol, ethanol, 1-propanol, 2-propanol, tert-butanol, acetone, diethyl ether, tert-butylmethyl ether, tetrahydrofuran, chloroform, 1,2-dichlorethane, methylene chloride, cyclohexane, ethyl acetate, n-hexane, n-heptane and/or methyl ethyl ketone for example may be used. Typically, methanol, ethanol, 1-propanol and/or 2-propanol is/are used as at least one solvent with a low boiling point. As at least one organic solvent with a middle boiling point 1-methoxy-2-propanol, 1-butanol, dibutyl ether, 1,4-dioxan, 3-methyl-1-butanol, 4-hydroxy-4-methyl-2-pentanone, methyl-isobutylketone and/or toluol for example may be used. Typically, 1-methoxy-2-propanol and/or 4-hydroxy-4-methyl-2-pentanone is/are used as at least one solvent with a middle boiling point.

The weight ratio of the at least one solvent with a low boiling point to the at least one solvent with a middle boiling point is typically 1:1, further typically 1:1.4, more typically 1:1.5 and most typically 1:1.7.

As at least one solvent at least one organic solvent with a low boiling point, at least one solvent with a middle boiling point and water may be used. The weight ratio of the at least one solvent with a low boiling point to the at least one solvent with a middle boiling point to water is typically 2:7:1, further typically 2.5:6.5:1, further typically 3:6:1, more typically 3:5:1 and most typically 3:6:1.

The at least one primer coating composition may comprise optionally at least one additive. The at least one additive may comprise at least one dispersing agent, at least one anti-settling agent, at least one wetting agent, at least one biocide, at least one UV-absorber or mixtures thereof. The at least one additive may be present in the at least one primer coating composition typically in an amount from a range of from 0.01% by weight to 1.7% by weight, further typically in an amount from a range of from 0.07% by weight to 1.4% by weight, more typically in an amount from a range of from 0.09% by weight to 1.1% by weight and most typically in an amount from a range of from 0.1% by weight to 0.7% by weight, each based on the total weight of the at least one primer coating composition. The amounts mentioned before apply with regard to one type of additive as well as with regard to a mixture of different additives.

The at least one primer coating composition comprising the components i) to iii), i.e., the at least one dispersion, the at least one solvent and optionally the at least one additive, after application on at least one of the uncoated or precoated surfaces of the spectacle lens substrate, drying and curing results in at least one primer coating.

The at least one primer coating composition resulting in at least one primer coating is typically applied to at least one precoated or uncoated surface of the optical lens substrate, further typically on both surfaces thereof, by dip coating or by spin coating.

The components of the at least one primer coating composition resulting in at least one primer coating are used in that they add to 100% by weight, based on the total weight of the at least one primer coating composition.

Alternatively or additionally to the before mentioned at least one primer coating, the coating of the spectacle lens may comprise at least one primer coating based on at least one primer coating composition typically comprising
  i) at least one aqueous aliphatic, cycloaliphatic, aromatic or heteroaromatic polyurethane dispersion, at least one aqueous aliphatic, cycloaliphatic, aromatic or heteroaromatic polyurea dispersion, at least one aqueous aliphatic, cycloaliphatic, aromatic or heteroaromatic polyurethane-polyurea dispersion and/or at least one aqueous aliphatic, cycloaliphatic, aromatic or heteroaromatic polyester dispersion, typically at least one aqueous aliphatic polyurethane dispersion or at least one aqueous aliphatic polyester dispersion and more typically at least one aqueous aliphatic polyurethane dispersion,
  ii) at least one solvent,
  iii) at least one base, and
  iv) optionally at least one additive.

The at least one aqueous aliphatic, cycloaliphatic, aromatic or heteroaromatic polyurethane dispersion, at least one aqueous aliphatic, cycloaliphatic, aromatic or heteroaromatic polyurea dispersion, at least one aqueous aliphatic, cycloaliphatic, aromatic or heteroaromatic polyurethane-polyurea dispersion and/or at least one aqueous aliphatic, cycloaliphatic, aromatic or heteroaromatic polyester dispersion is/are present in the at least one primer coating composition in a total amount selected from a range typically of from 2% by weight to 31% by weight, further typically of from 4% by weight to 26% by weight, further typically of from 5% by weight to 21% by weight, more typically of from 6% by weight to 20% by weight and most typically of from 7% by weight to 19% by weight, each based on the total weight of the at least one primer coating composition. The total amount comprises the amount of only one of the dispersions mentioned before or a mixture thereof.

The at least one primer coating composition comprises typically at least one aqueous polyurethane dispersion, wherein the polyurethane comprises a polyester unit as a spacer or the polyurethane dispersion is a polyurethane-polyurea dispersion, characterized by the occurrence of both urethane and urea groups in a macromolecular chain of the polyurethane-polyurea. Such polyurethane dispersions are described for example in WO 94/17116 A1, in particular in WO 94/17116 A1, page 7, lines 11 to 33. The aqueous polyurethane dispersion may be blended with anionically stabilized acrylic emulsions, as described in WO 94/17116 A1, in particular in WO 94/17116 A1, page 7, lines 33 to 35. According to WO 94/17116 A1, page 7, lines 11 to 33, an aqueous polyurethane dispersion typically is a polyurethane-polyurea, i.e., a polymer characterized by the occurrence of both urethane and urea groups in a macromolecular chain. The aqueous polyurethane dispersion may be blended with anionically stabilized acrylic emulsions as mentioned in WO 94/17166 A1, in particular in WO 94/17116 A1, page 7, lines 33 to 35.

The at least one solvent is present in the at least one primer coating composition in an amount typically from a range of from 69% by weight to 98% by weight, further preferable of from 73% by weight to 96% by weight, more typically of from 76% by weight to 94% by weight and most typically of from 79% by weight to 93% by weight, each based on the total weight of the at least one primer coating composition. The amounts mentioned before apply with regard to one type of solvent as well as with regard to a mixture of different solvents.

As at least one solvent typically at least one organic solvent with a low boiling point of <100° C. under normal pressure and at least one organic solvent with a middle boiling of 100° C. to 150° C. under normal pressure may be used. As at least one organic solvent with a low boiling point methanol, ethanol, 1-propanol, 2-propanol, tert-butanol, acetone, diethyl ether, tert-butylmethyl ether, tetrahydrofuran, chloroform, 1,2-dichlorethane, methylene chloride, cyclohexane, ethyl acetate, n-hexane, n-heptane and/or methyl ethyl ketone for example may be used. Typically, methanol, ethanol, 1-propanol and/or 2-propanol are used as at least one solvent with a low boiling point. As at least one organic solvent with a middle boiling point 1-methoxy-2-propanol, 1-butanol, dibutyl ether, 1,4-dioxan, 3-methyl-1-butanol, 4-hydroxy-4-methyl-2-pentanone, methylisobutylketone and/or toluol for example may be used. Typically, 1-methoxy-2-propanol and/or 4-hydroxy-4-methyl-2-pentanone is/are used as at least one solvent with a middle boiling point.

The weight ratio of the at least one solvent with a low boiling point to the at least one solvent with a middle boiling point is typically 1:1, further typically 1:1.4, more typically 1:1.5 and most typically 1:1.7.

Further, additionally to the at least one solvent with a low boiling point and/or to the at least one solvent with a middle boiling point, the primer coating composition may comprise water. The weight ratio of the at least one solvent with a low boiling point to the at least one solvent with a middle boiling point to water is typically 2:7:1, further typically 2.5:6.5:1, further typically 3:6:1, more typically 3:5:1 and most typically 3:6:1.

Further, the primer coating composition comprises at least one base, which confers a buffering effect with respect to the pH value to the at least one primer coating resulting from that primer coating composition. The at least one base typically retards, more typically inhibits an acidic component to come into contact with an adjacent layer, typically an adjacent layer which is located nearer or next or adjacent to the spectacle lens substrate. The primer coating composition comprises the at least one base in an amount in the range of typically from 0.1% by weight to 3.2% by weight, further typically from 0.2% by weight to 2.8% by weight, further typically from 0.3% by weight to 2.4% by weight, more typically from 0.4% by weight to 1.9% by weight and most typically from 0.5% by weight to 1.6% by weight, each based on the total weight of the primer coating composition. The amounts given before apply to the use of one type of base as well as to the use of a mixture of different bases. The primer coating composition may comprise as at least one base for example imidazole, 1-methylimidazole, 2-methylimidazole, 4-methylimidazole, 2,5-dimethylimidazole, 4-hydroxymethylimidazole, pyrazole, 1,2,3-triazole, 1,2,4-triazole, tetrazole, pentazole, pyrrole, pyrrolidine, pyridine, 4-aminopyridine, 4-methylpyridine, 4-methoxypyridine, 2,4,6-trimethylpyridine, piperidine, piperazine, triethylamine, di-isopropyl amine, di-isobutyl amine, caustic soda and/or caustic potash. Typically, the primer coating composition comprises at least one base selected from the group consisting of 2-methlyimidazole, imidazole, 1-methylimidazole, 4-methylimidazole, 2,5-dimethylimidazole, triethylamine and caustic soda, more typically at least one base selected from the group consisting of 2-methylimidazole, 1-methylimidazole, 4-methylimidazole and caustic soda. Most typically, the primer coating composition comprises at least one base selected from the group consisting of 2-methylimidazole and 1-methylimidazole in an amount of a range from 0.1% by weight to 2% by weight, typically from 0.3% by weight to 1.5% by weight, each based on the total weight the primer coating composition. The amounts mentioned before apply to the use of a mixture of 2-methylimidazole and 1-methylimidazole as well as to the use of 2-methylimidazole or to the use of 1-methylimidazole.

The primer coating composition may comprise optionally at least one additive. The at least one additive may comprise at least one dispersing agent, at least one anti-settling agent, at least one wetting agent, at least one biocide, at least one UV-absorber or mixtures thereof. The at least one additive may be present in the primer coating composition typically in an amount of from 0.01% by weight to 1.7% by weight, further typically in an amount of from 0.07% by weight to 1.4% by weight, more typically in an amount of from 0.09% by weight to 1.1% by weight and most typically in an amount of from 0.1% by weight to 0.7% by weight, each based on the total weight of the primer coating composition. The amounts mentioned before apply with regard to one type of additive as well as with regard to a mixture of different additives.

The primer coating composition comprising the components i) to iv), i.e., the at least one dispersion, the at least one solvent, the at least one base and optionally the at least one additive, after application to at least one precoated or uncoated surface of the spectacle lens substrate, drying and curing results in at least one primer coating.

The primer coating composition resulting in at least one primer coating is typically applied to at least one precoated or uncoated surface of the spectacle lens substrate by dip coating or by spin coating.

The components of the primer coating composition resulting in at least one primer coating are used in that they add to 100% by weight based on the total weight of the primer coating composition.

In case the spectacle lens comprises at least one hard coating, optionally at least one primer coating and at least one antibacterial and/or antiviral coating, the at least one antibacterial and/or antiviral typically is the outermost coating thereof. The uncoated or precoated surface of the spectacle lens substrate to be coated with at least one hard coating, optionally with at least one primer coating and with at least one antibacterial and/or antiviral coating, comprises the optional at least one primer coating as the coating nearest to the surface of the spectacle lens substrate and the at least one antibacterial and/or antiviral coating furthest away from that surface.

In one exemplary embodiment, the coating of the spectacle lens comprises at least one photochromic coating. Typically, only the precoated or uncoated finished front surface of the spectacle lens substrate comprises or is coated with at least one photochromic coating. If a spectacle lens comprises at least one hard coating, optionally at least one primer coating and at least one photochromic coating, typically the at least one photochromic coating is the coating next, but not necessarily adjacent, to the surface of the spectacle lens substrate to be coated and the hard coating is the coating furthest away from that surface. The surface of the spectacle lens substrate typically is optically finished and may be precoated or uncoated. In case the spectacle lens comprises at least one hard coating, optionally at least one primer coating, at least one photochromic coating and at least one antibacterial and/or antiviral coating, typically the at least one photochromic coating is the coating next to, but not necessarily adjacent to, the surface of the spectacle lens substrate to be coated, whereas the at least one antibacterial and/or antiviral coating is the coating furthest away from that surface. The at least one photochromic coating may for example be based on a photochromic composition described in EP 1 433 814 A1, EP 1 602 479 A1 or EP 1 561 571 A1.

EP 1 433 814 A1, in particular EP 1 433 814 A1, claim 1, discloses a photochromic composition comprising (1) 100 parts by weight of radically polymerizable monomers; (2) 0.01 to 20 parts by weight of an amine compound; and (3) 0.01 to 20 parts by weight of a photochromic compound, the radically polymerizable monomers including a radically polymerizable monomer having a silanol group or a group which forms a silanol group by hydrolysis, and/or a radically polymerizable monomer having an isocyanate group. According to EP 1 433 814 A1 to increase adhesion between the photochromic coating resulting from the photochromic composition described therein and a spectacle lens substrate, a radically polymerizable monomer having a silanol group or a group which forms a silanol group by hydrolysis or a radically polymerizable monomer having an isocyanate group is used. Usable monomers are mentioned in EP 1 433 814 A1, page 3, paragraph [0025], to page 7, paragraph Additionally, according to EP 1 433 814 A1 the photochromic composition may include other radically polymerizable monomers. As other polymerizable monomers, a combination of a radically polymerizable monomer having a homopolymer L-scale Rockwell hardness of at least 60 ("high-hardness monomer") and a radically polymerizable monomer having a homopolymer L-scale Rockwell hardness of 40 or less ("low-hardness monomer") is typically used to improve the characteristic properties such as solvent resistance, hardness and heat resistance of the resulting photochromic coating or the photochromic properties thereof such as color development intensity and fading speed. Examples and explanations with respect to the high-hardness monomers and the low-hardness monomers are given in EP 1 433 814 A1, page 7, paragraph [0052], to page 13, paragraph [0096]. To improve the balance of the characteristic properties such as solvent resistance, hardness and heat resistance or photochromic properties such as color development intensity and fading speed of the resulting photochromic coating, the amount of a low-hardness monomer is typically 5 to 70% by weight and the amount of a high-hardness monomer is typically 5 to 95% by weight based on the total of all the other radically polymerizable monomers excluding the radically polymerizable monomer having a silanol group or a group which forms a silanol group by hydrolysis and the radically polymerizable monomer having an isocyanate group. Further, according to EP 1 433 814 A1, it is particularly preferred that a monomer having at least three radically polymerizable groups should be contained as the high-hardness monomer in an amount of at least 5% by weight based on the total of all other radically polymerizable monomers. Further typically, according to EP 1 433 814 A1, the radically polymerizable monomers include a radically polymerizable monomer having at least one epoxy group and at least one radically polymerizable group in the molecule besides the mentioned monomers classified by hardness. The durability of a photochromic compound and the adhesion of the photochromic coating can be improved by using the radically polymerizable monomer having at least one epoxy group. Radically polymerizable monomers having at least one epoxy group and at least one radically polymerizable group in the molecule are disclosed in EP 1 433 814 A1, page 13, paragraph [0101], to page 14, paragraph [0105]. According to EP 1 433 814 A1, the amount of the radically polymerizable monomer having at least one epoxy group and at least one radically polymerizable group in the molecule is typically 0.01 to 30% by weight, particularly typically 0.1 to 20% by weight based on the total of all other radically polymerizable monomers. The photochromic composition described in EP 1 433 814 A1 comprises at least one amine compound in an amount of 0.01 to 20 parts by weight based on 100 parts by weight of the total of all the radically polymerizable monomers in addition to the above mentioned radically polymerizable monomers. Examples for the at least one amine compound is given in EP 1 433 814 A1, page 14, paragraph [0108], to page 15, paragraph [0112]. The photochromic composition disclosed in EP 1 433 814 A1 comprises at least one photochromic compound in an amount of 0.01 to 20 parts by weight, typically 0.05 to 15 parts by weight and more typically 0.1 to 10 parts by weight based on 100 parts by weight of the total of all radically polymerizable monomers. Examples for photochromic compounds are given in EP 1 433 814 A1, page 15, paragraph [0114] to page 20, paragraph [0122].

EP 1 602 479 A1, in particular EP 1 602 479 A1, claim 9, discloses a photochromic composition comprising 100 parts by weight of a radically polymerizable monomer, 0.001 to 5 parts by weight of a silicone base or fluorine base surfactant and 0.01 to 20 parts by weight of a photochromic compound. According to EP 1 602 479 A1, the photochromic composition comprises a radically polymerizable monomer having a silanol group or a group which forms a silanol group by hydrolysis, an amine compound and a photochromic compound. The use amount of the radically polymerizable monomer having a silanol group or a group which forms a silanol group by hydrolysis is suitably 0.5 to 20% by weight, particularly 1 to 10% by weight based on the total weight of the whole coating agents. Other radically polymerizable monomers which according to EP 1 602 479 A1 can be used together with the radically polymerizable monomer having a silanol group or a group which forms a silanol group by hydrolysis, such as trimethylolpropane trimethacrylate, trimethylolpropane triacrylate, tetramethylolmethane trimethacrylate, tetramethylolmethane tri acrylate, trimethylolpropane tri ethyl ene glycol triacrylate, pentaerythritol tetramethacrylate, dipentaerythritol hexaacrylate, urethane oligomer tetraacrylate, urethane oligomer hexamethacrylate, urethane oligomer hexaacrylate, polyester oligomer hexaacrylate, diethyleneglycol dimethacrylate, triethyleneglycol dimethacrylate, tetraethyleneglycol dimethacrylate, tripropireneglycol dimethacrylate, bisphenol A dimethacrylate, 2,2-bis(4-methacryloyloxyethoxydiphenyl) propane, glycidyl methacrylate, 2,2-bis(4-acryloyloxypolyethylene glycol phenyl)propane having an average molecular weight of 776 or methyl ether polyethylene glycol methacrylate having an average molecular weight of 475. The use amount of the other radically polymerizable monomers is suitably 20 to 90% by weight, particularly 40 to 80% by weight based on the weight of the whole coating agents. The use amount of the amine compound, such as triethanolamine, N-methyldiethanolamine, trii soprop anol amine, N,N-dim ethyl aminoethyl methacrylate or N,N-di ethyl aminoethyl methacrylate for example, is suitably 0.01 to 15% by weight, particularly 0.1 to 10% by weight based on the weight of the whole coating agents. The use amount of the photochromic compound such as a naphthopyran derivative, a chromene derivative, a spirooxazine derivative, a spiropyran derivative or a fulgimide derivative is suitably 0.1 to 30% by weight, particularly 1 to 10% by weight based on the weight of the whole coating agents.

In case the spectacle lens comprises at least one photochromic coating, typically the front surface of the uncoated or precoated spectacle lens substrate comprising the at least one photochromic coating, the spectacle lens may optionally comprise at least one photochromic primer. Typically the front surface of the spectacle lens substrate comprises the at least one photochromic primer and the at least one photochromic coating, the photochromic coating being the outermost coating thereof. The at least one photochromic primer may comprise the polyurethane resin layer disclosed in EP 1 602 479 A1, in particular in EP 1 602 479 A1, claim 1, or the primer layer disclosed in WO 03/058300 A1, in particular in WO 03/058300 A1, page 22, line 3 to page 23, line 13.

In one exemplary embodiment, the spectacle lens may comprise at least one mirror coating. In case the spectacle lens comprises at least one mirror coating and at least one antibacterial and/or antiviral coating. the at least one mirror coating is typically next to but not necessarily adjacent to the at least one antibacterial and/or antiviral coating with the at least one antibacterial and/or antiviral coating being the outermost layer thereof. Next to, but not necessarily adjacent to, typically means the at least one mirror coating and the at least one antibacterial and/or antiviral coating being located on the identical uncoated or precoated surface of the spectacle lens substrate. Typically, only the front surface of the spectacle lens substrate comprises at least one mirror coating and at least one antibacterial and/or antiviral coating, the at least one antibacterial and/or antiviral coating being the outermost coating thereof. The at least one mirror coating typically comprises alternating dielectric layers in the manner of a Bragg mirror and/or at least one semitransparent metal layer. The at least one semitransparent metal layer may comprise, for example, an aluminum layer, chromium layer, gold layer and/or silver layer, typically a silver layer. The layer thickness of the semitransparent metal layer is typically within a range of from 4 nm to 48 nm, more typically within a range of from 8 nm to 41 nm and most typically within a range of from 17 nm to 33 nm. The at least one semitransparent metal layer is typically applied by means of a physical vapor deposition method.

The spectacle lens comprises typically at least one antireflective coating. The at least one antireflective coating typically comprises alternating discrete metal oxide, metal hydroxide and/or metal oxide hydrate layers composed of or comprising aluminum, silicon, zirconium, titanium, yttrium, tantalum, neodymium, lanthanum, niobium and/or praseodymium. The at least one antireflective coating typically comprises at least one layer of a metal oxide, metal hydroxide and/or metal oxide hydrate layer composed of or comprising silicon, which typically forms the outermost layer of the antireflective coating. The antireflective coating typically comprises a coating stack of at least one layer with a high refractive index (HRI) and of at least one layer with a low refractive index (LRI). There is no limitation for the number of layers. However, from the perspective of broadband reflection reduction, the layer total number in the antireflective coating is typically higher than or equal to 3, further typically higher than or equal to 5, and lower than or equal to 9. Typically, the HRI layers have a physical thickness ranging from 10 to 120 nm and the LRI layers have a physical thickness ranging from 10 to 100 nm. The at least one antireflective coating typically has a total layer thickness from a range from 100 nm to 1000 nm, typically from a range from 110 nm to 800 nm, further typically from a range from 120 nm to 750 nm, more typically from a range from 130 nm to 700 nm and most typically from a range from 140 nm to 500 nm. The at least one antireflective coating may be designed with respect to the desired optical properties thereof typically by using the software OptiLayer, version 12.37, of company OptiLayer GmbH, 85748 Garching b. München, or the software Essential MacLeod, version 11.00.541, of company Thin Film Center Inc., 2745 E Via Rotunda, Tucson, AZ USA. For designing the at least one antireflective coating, the respective refractive indices of the layer materials typically are assumed to be wavelength dependent. In case the antireflective coating comprises at least one layer of $SiO_2$ and at least one layer of $TiO_2$, the designing the antireflective coating typically is based on a refractive index for $TiO_2$ of n=2.420 at 550 nm and a refractive index for $SiO_2$ of n=1.468 at 550 nm.

The at least one antireflective coating may comprise the layer sequence and the layer thickness indicated in EP 2 437 084 A1, in FIGS. 3 and 5, in each case between the superhydrophobic layer and the hard lacquer layer or the layer sequence and the layer thicknesses disclosed in paragraph [0056] of EP 2 801 846 A1.

In a spectacle lens comprising at least one hard coating and at least one antireflective coating, the at least antireflective coating typically forms the outermost coating. The antireflective coating is typically disposed on top of the at least one hard coating on the eye side and/or object side of the spectacle lens. In case the spectacle lens comprises at least one antireflective coating and at least one antibacterial and/or antiviral coating, typically the at least one antibacterial and/or antiviral coating is the outermost coating thereof.

In one exemplary embodiment, the spectacle lens may comprise at least one electrically conductive or semiconductive layer. The at least one electrically conductive or semiconductive layer may comprise, for example, a layer composed of or comprising indium tin oxide $((In_2O_3)_{0.9}(SnO_2)_{0.1}$; ITO), fluorine tin oxide ($SnO_2$:F; FTO), aluminum zinc oxide (ZnO:Al; AZO) and/or antimony tin oxide ($SnO_2$:Sb; ATO). Typically, the electrically conductive or semiconductive layer comprises a layer composed of or comprising ITO or composed of or comprising FTO. An electrically conductive or semiconductive layer arranged as the outermost layer of the spectacle lens on the object side and/or eye side reduces or avoids the static charging of the spectacle lens. This in turn facilitates the cleaning of the spectacle lens. The at least one electrically conductive or semiconductive layer may be one of the layers of the antireflective coating.

Typically the at least one antireflective coating is manufactured by physical vapor deposition, typically by means of electron beam evaporation or thermal evaporation in a vacuum chamber.

The spectacle lens comprises at least one antibacterial and/or antiviral coating. The at least one antibacterial and/or antiviral coating typically is the outermost coating in the coating sequence of the spectacle lens. Typically, the spectacle lens comprises on the front surface, i.e., according to DIN EN ISO 13666:2019-12, section 3.2.13, the surface intended to be fitted away from the eye, and on the back surface, i.e., according to DIN EN ISO 13666:2019-12, section 3.2.14, the surface intended to be fitted nearer to the eye, at least one antibacterial and/or antiviral coating. The at least one antibacterial and/or antiviral coating typically comprises at least one biocidal inorganic component, typically selected from at least one biocidal inorganic metal, at least one biocidal inorganic metal oxide, at least one biocidal inorganic metal hydroxide, at least one biocidal inorganic metal oxide hydrate and/or at least one biocidal inorganic metal sulfide. The at least one biocidal inorganic component typically has the functionality of oxidation or light induced oxidation via direct contact to achieve the antiviral and/or antibacterial effect of the at least one antibacterial and/or antiviral coating. The at least one antibacterial and/or antiviral coating may cover the adjacent coating underneath, i.e., the adjacent coating in direction to the respective surface of the spectacle lens substrate, completely or partially. A partial covering or partial coating could be that for example only one half of the coating underneath is covered by or coated with the at least one antibacterial and/or antiviral coating or that the at least one antibacterial and/or antiviral coating comprises any arbitrary shape of islands on the outermost surface of an adjacent coating underneath the at least one antibacterial and/or antiviral coating. Typically the at least one antibacterial and/or antiviral coating covers the adjacent coating underneath completely. In case the at least one antibacterial and/or antiviral coating is not the outermost coating of the spectacle lens, the outermost coating may cover the underneath adjacent antibacterial and/or antiviral coating completely or partially.

The at least one antibacterial and/or antiviral coating typically is based on at least one modified clean coat layer. The at least one modified clean coat layer typically comprises at least one biocidal inorganic component. The at least one modified clean coat layer may comprise at least one clean coat layer doped with at least one biocidal inorganic component. The at least one biocidal inorganic component typically is selected from at least one of the group consisting of at least one biocidal inorganic metal, at least one biocidal inorganic metal oxide, at least one biocidal inorganic metal hydroxide, at least one biocidal inorganic metal oxide hydrate, at least one biocidal inorganic metal salt and at least one biocidal inorganic metal sulfide. The at least one biocidal inorganic component may comprise at least one biocidal inorganic metal, at least one biocidal inorganic metal oxide, at least one biocidal inorganic metal hydroxide, at least one biocidal inorganic metal oxide hydrate, at least one metal salt and/or at least one biocidal inorganic metal sulfide each composed of or comprising silver, typically Ag, AgO, $Ag_2O$, $AgNO_3$, $Ag_2S$; copper, typically Cu, $Cu_2O$; titanium, typically TiO, $TiO_2$, $Ti_2O_3$, $Ti_3O_4$; zinc, typically ZnO; and/or iron, typically FeO, $Fe_2O_3$. The at least one biocidal inorganic component may comprise at least one metal, at least one metal oxide, at least one metal hydroxide, at least one metal oxide hydrate, at least one metal salt, at least one metal sulfide or a combination thereof. As at least one metal one metal or a combination of different metals, as at least one metal oxide one type of metal oxide or a combination of different types of metal oxides, as at least one metal hydroxide one type of metal hydroxides or a combination of different types of metal hydroxides, as at least one metal oxide hydrate one type of metal oxide hydrate or a combination of different types of metal oxide hydrates, as at least one metal salt one type of metal salt or a combination of metal salts and as at least one metal sulfide one type of metal sulfide or a combination of different types of metal sulfides may be used. Typically, the at least one biocidal inorganic component comprises at least one biocidal inorganic metal, at least one biocidal inorganic metal oxide, at least one biocidal inorganic metal hydroxide, at least one biocidal inorganic metal oxide hydrate, at least one biocidal inorganic metal salt and/or at least one biocidal inorganic metal sulfide each composed of or comprising silver, typically Ag, AgO, $Ag_2O$, $AgNO_3$, $Ag_2S$; copper, typically Cu, $Cu_2O$; and/or zinc, typically ZnO. Further typically, the at least one biocidal inorganic component comprises at last one biocidal inorganic metal, at least one biocidal inorganic metal oxide, at least one biocidal inorganic metal hydroxide, at least one biocidal inorganic metal oxide hydrate and/or at least one biocidal inorganic metal salt each composed of or comprising silver, typically Ag, AgO and/or $Ag_2O$; and/or composed of or comprising copper, typically Cu, $Cu_2O$. Particularly typically, the at least one biocidal inorganic component comprises at least one biocidal metal, at least one biocidal metal oxide, at least one biocidal metal hydroxide, at least one biocidal metal oxide hydrate and/or at least one metal salt composed of or comprising silver, typically Ag, AgO, $Ag_2O$ and/or $AgNO_3$.

Typically, the at least one antibacterial and/or antiviral coating based on at least one modified clean coat layer comprises the at least one biocidal inorganic component in the form of particles, typically distributed within the at least one antibacterial and/or antiviral coating. The particles of the at least one biocidal inorganic component being distributed within the at least one antibacterial and/or antiviral coating does not necessary mean that all particles are within the at least one antibacterial and/or antiviral coating based on at least one modified clean coat layer. At least some of the particles may also be covered by the at least one antibacterial and/or antiviral coating, typically by the at least one clean coat layer, but protruding the at least one antibacterial and/or antiviral coating or at least some of the particles are distributed uncovered on top of the at least one antibacterial and/or antiviral coating. The particle size of the at least one biocidal inorganic component typically is smaller than the layer thickness of the at least one antibacterial and/or antiviral coating based on at least one modified clean coat layer. Typically, the particle size of the at least one biocidal inorganic component lies within a range from 1 nm to 10 nm, further typically from 1 nm to 8 nm, more typically from 1 nm to 5 nm and most typically from 1 nm to 3 nm.

The at least one antibacterial and/or antiviral coating based on at least one modified clean coat layer comprises the at least one biocidal inorganic component in an amount selected from a range typically from 1% by weight to 60% by weight, further typically from 5% by weight to 50% by weight, more typically from 10% by weight to 40% by weight, and particularly typically from 20% by weight to 30% by weight, each based on the total weight of the at least one antibacterial and/or antiviral coating based on at least one modified clean coat layer. The amounts for the at least one biocidal inorganic component given before apply for the use of one type of biocidal inorganic component as well as for the use of a combination of different types of biocidal inorganic components. One type of biocidal inorganic components may further comprise the identical or a different metal ion or the identical metal ion, but a different particle size. The amounts of the at least one biocidal inorganic component are typically determined by a scanning electron microscope equipped with energy dispersive X-ray spectroscopy.

The average thickness of the at least one antibacterial and/or antiviral coating based on at least one modified clean coat layer typically lies in a range from 1 nm to 50 nm, further typically from 1 nm to 30 nm, more typically from 1 nm to 20 nm, and particularly typically from 1 nm to 10 nm. The average thickness of the at least one antibacterial and/or antiviral coating is typically determined by at least one scanning electron microscope photograph of a cross-section of the spectacle lens comprising at least a spectacle lens substrate and the at least one antibacterial and/or antiviral coating based on at least one modified clean coat layer. In the at least one scanning electron microscope photograph, the physical thickness of the at least one antibacterial and/or antiviral coating based on at least one clean coat layer is determined in at least three positions and the arithmetic average is formed thereof.

Typically the water contact angle of the at least one antibacterial and/or antiviral coating based on at least one clean coat layer lies in a range of from 90° to 120°, more typically in a range of from 105° to 115°. With a water contact angle lying in the before mentioned range, the at least one antibacterial and/or antiviral coating based on at least one modified clean coat layer maintains the characteristic of the clean coat component when used as clean coat layer. The water contact angle typically is determined by means of an OCA 20 contact angle meter from DataPhysics Instruments using deionized water with a droplet size of 1 and 10 µL as liquid.

The at least one antibacterial and/or antiviral coating based on at least one modified clean coat layer typically comprises the at least one biocidal inorganic component as described above and at least one clean coat component. The at least one clean coat component may confer oleophobic or hydrophobic properties to the at least one antibacterial and/or antiviral coating based on at least one modified clean coat layer. Oleophobic or hydrophobic properties of a clean coat layer are disclosed for example in EP 1 392 613 A1, wherein water forms a contact angle of more than 90°, typically of more than 100° and particularly of more than 110°. The at least one clean coat component may comprise for example at least one fluoro organic component covalently bonding to an underneath adjacent coating as disclosed in DE 198 48 591 A1, claim 1, or at least one component based on perfluoropolyethers. The at least one clean coat component typically is of hydrophobic nature to ensure the spectacle lens to having an easy to clean surface. Typical contaminations on the surface of a spectacle lens could then be easily removed by liquid droplets, typically water droplets, just rolling off or rolling of in combination with wiping. The hydrophobicity of clean coat component is further advantageous in that it helps to slowly release the biocidal components thereby enhancing the durability of biocidal efficacy of the lens.

The at least one clean coat component comprises typically at least one silane having at least one fluorine-containing group, which exhibits typically more than 20 carbon atoms. Per- or polyfluoroalkyl compounds (PFAS) with silane functionality that comprise at least one —$(CF_2)_x$— unit (x≥1) are commonly used. In case, the at least one antibacterial and/or antiviral coating based on at least one modified clean coat layer is adjacent to and on top of at least one antireflective coating, i.e., the at least one antibacterial and/or antiviral coating being the outermost coating thereof, the per- or polyfluoroalkyl silanes of the at least one clean coat component typically react with the hydroxyl groups of a directly adjacent coating of the at least one antireflective coating to covalently bonding to the at least one antibacterial and/or antiviral coating based on at least one modified clean coat layer through condensation.

Typically, the at least one antibacterial and/or antiviral coating based on at least one modified clean coat layer is obtained by physical vapor deposition. Therefore, the at least one biocidal inorganic component and the at least one clean coat component are typically co-deposited on the respective surface to be coated. The at least one biocidal inorganic component typically is deposited as the respective at least one metal, at least one metal oxide, at least one metal hydroxide, at least one metal oxide hydrate and/or at least one metal sulfide. Alternatively, the respective metal of the at least one biocidal inorganic component may be deposited under the respective atmosphere, for example to deposit at least one metal oxide, the co-deposition is performed under an oxygen containing atmosphere.

The at least one biocidal inorganic component and the at least one clean coat component typically forming the at least one antibacterial and/or antiviral coating based on at least one modified clean coat layer typically are co-deposited through co-deposition under vacuum according to at least one of the following methods: i) by optionally ion-beam assisted co-evaporation; ii) by ion-beam co-sputtering; iii) by cathode co-sputtering and/or by iv) by plasma-assisted chemical vapor co-deposition. Evaporation under vacuum in the optionally ion-beam assisted co-evaporation method i) can be done using at least one of the following evaporation sources: a) at least one thermal evaporator to heat the at least one component to be evaporated under vacuum by resistive heating of at least one metal container comprising the at least one component; b) at least one electron beam gun to heat the at least one component to be evaporated under vacuum via an electron beam. In contrast to conventional deposition methods under vacuum, in which only one component is deposited from one single deposition source at the same time, for example from one single evaporation source or from one single sputter source, for the co-deposition under vacuum resulting in the at least one antibacterial and/or antiviral coating based on at least one modified clean coat layer typically at least two deposition sources are operated simultaneously. Typically, at least one of the at least two deposition sources is used to deposit the at least one biocidal inorganic component and at least one of the at least two deposition sources is used to deposit the at least one clean coat component. The at least two deposition sources for co-depositing the at least one biocidal component and the at least one clean coat component typically forming the at least one antibacterial and/or antiviral coating based on at least one modified clean coat layer may be of the identical type or may be of different types of deposition sources. Further, the at least two deposition sources for co-depositing the at least one biocidal component and the at least one clean coat component typically forming the at least one antibacterial and/or antiviral coating based on at least one modified clean coat layer may be of the identical type in case the identical method selected from the above mentioned methods i) to iv) is used or may be of different types of deposition sources, both in case the identical method selected from the above mentioned methods i) to iv) as well as in case different methods selected from the above mentioned methods i) to iv) is used. In case the identical method according to any one of the methods i) to iv) mentioned above is used for co-deposition, for example, in case the at least one antibacterial and/or antiviral coating based on at least one modified clean coat layer is manufactured according to the co-deposition method i) mentioned above, i.e., by optionally ion-beam assisted co-evaporation, for example the at least one evaporation source to deposit the at least one biocidal inorganic component may be at least one thermal evaporator and the at least one evaporation source to deposit the at least one clean coat component may be at least one electron beam gun. Alternatively, for example, the at least one evaporation source to deposit the at least one biocidal inorganic component may be at least one electron beam gun and the at least one evaporation source to deposit the at least one clean coat component may be at least one thermal evaporator. Further, for example, the at least one evaporation source to deposit the at least one biocidal inorganic component and the at least one evaporation source to deposit the at least one clean coat component may be of the identical type of evaporation source.

In case at least two biocidal inorganic components are to be co-deposited, the at least two deposition sources used therefor may be of identical type or of different type. In case at least two clean coat components are to be co-deposited, the at least two deposition sources used therefor may be of identical type or of different type. Further, the method for co-deposition of the at least two biocidal inorganic components and/or the method for co-deposition of the at least two clean coat components each according to any one of the methods i) to iv) mentioned above may be of identical type or at least two different methods may be used.

Irrespective of the fact if the at least two deposition sources used are of identical type or of different type, the co-deposition of all components to be deposited simultaneously is preferred.

The described co-deposition typically is an ion-assisted co-deposition. Ion-assisted co-deposition typically means that further simultaneously to the co-deposition of the at least one biocidal inorganic component and the at least one clean coat component the surface to be coated with the at least one antibacterial and/or antiviral coating based on at least one clean coat layer is bombarded with at least one ion-beam. The at least one ion-beam may be produced by at least one ion gun emitting for example gas ions of $Ar^+$, $Ar_{2+}$, $O_2^+$ and/or $N_2^+$.

To achieve a stable and consistent co-deposition rate of the at least one biocidal inorganic component and the at least one clean coat component, the conditions for the vacuum co-deposition, typically for the co-evaporation mentioned above, optionally ion-beam assisted, typically are at least one of the following: the chamber pressure during the co-deposition typically is in a range from $1\times10^{-6}$ mbar to $1\times10^{-3}$ mbar, further typically from $1\times10^{-5}$ mbar to $1\times10^{-4}$ mbar, the thermal evaporator voltage typically is in a range from 0.5 to 7V, further typically from 1 to 5V, the electrical current typically is in a range from 10 A to 350 A, further typically from 100 A to 300 A, the electron beam evaporator voltage is typically set to 6 kV to 10 kV, the beam current typically is in a range from 20 mA to 80 mA, further typically from 30 mA to 60 mA, optionally the chamber is purged with additional $O_2$ and/or Ar for ion-beam assistance, typically in a flow rate of 5 to 50 sccm $O_2$, and the overall deposition rate measured during co-deposition is typically set to 0.1 nm/s to 10 nm/s, further typically 1 nm/s to 5 nm/s.

Alternatively to the before mentioned co-deposition method to manufacturing the at least one antibacterial and/or antiviral coating based on at least one modified clean coat layer, the at least one antibacterial and/or antiviral coating based on at least one modified clean coat layer is manufactured by a diffusion process. In this alternative, the at least one clean coat component may be applied first on the surface to be coated. Therefore, the at least one clean coat component is typically deposited under vacuum according to at least one of the following methods: i) by optionally ion-beam assisted evaporation; ii) by thermal evaporation; iii) by cathode sputtering; and/or iv) by plasma-assisted chemical vapor deposition. Typically, the at least one clean coat component is deposited by evaporation, the evaporation being optionally ion-beam assisted. The deposition under vacuum is typically proceeded analogously to the co-deposition under vacuum described above. Typically the at least one biocidal inorganic component comprises at least one metal and/or at least one metal salt. Further typically, the at least one metal having a particle size within the range from 1 nm to 10 nm, further typically from 1 nm to 8 nm, more typically from 1 nm to 5 nm and most typically from 1 nm to 3 nm, is dispersed in at least one solvent. Further typically, the at least one metal salt is a dissolved in at least one solvent. In an atmosphere or in the presence of the dispersed at least one biocidal inorganic component and/or of the dissolved at least one biocidal inorganic component the at least one biocidal inorganic component typically diffuses into the at least one clean coat component to modify the at least clean coat layer resulting in the at least one antibacterial and/or antiviral coating. Typically the before mentioned diffusion process is combines with or accelerated by a physical wiping or scrubbing process of the surface to be coated with a cloth or tissue, or to heat up the uncoated or precoated spectacle lens substrate. The molecules of the at least one clean coat component in this case move significantly faster and the diffusion process is therefore improved.

Alternatively to both the before mentioned co-deposition method and the diffusion process, the at least one antibacterial and/or antiviral coating based on at least one modified clean coat layer is manufactured by a dip coating or spin coating process. In this alternative, the at least one biocidal inorganic component is dispersed in the at least one clean coat component and optionally in at least one solvent. Typically the at least one biocidal inorganic component comprises at least one metal and/or at least one metal salt. Further typically, the at least one metal having a particle size within the range from 1 nm to 10 nm, further typically from 1 nm to 8 nm, more typically from 1 nm to 5 nm and most typically from 1 nm to 3 nm, is dispersed in at least one solvent. Further typically, the at least one metal salt is a dissolved in at least one solvent. The optional at least one solvent is typically at least one organic solvent miscible with the at least one solvent in which the at least one biocidal inorganic component is dispersed or dissolved, and compatible with the at least one clean coat component. After application and typically thermal curing in a proper temperature range from 30° C. to 70° C., further typically from 40° C. to 60° C. the at least one antibacterial and/or antiviral coating is obtained. The curing time is typically to be 30 min to 300 min, further typically from 120 min to 180 min.

The at least one antibacterial and/or antiviral coating based on at least one modified clean coat layer typically functions both as clean coat layer and as antibacterial and/or antiviral coating. So, no additional coating is needed to function as at least one antibacterial and/or antiviral coating. Due to the coexistence of antibacterial and/or antiviral property and hydrophobicity of clean coat layer, superior effect in terms of the durability of biocidal efficacy is exhibited. Further the coating sequence of the spectacle lens needs not to be adapted. Typically, the optical performance is not adversely affected. In one exemplary embodiment, the biocidal component and the clean coat component reside in a single layer and form a single layer. In a preferred exemplary embodiment, the at least one antibacterial and/or antiviral coating based on at least one modified clean coat layer is the modified clean coat layer described above. All the features and variations described with regard to the at least one antibacterial and/or antiviral coating based on at least one modified clean coat layer also apply to the at least one antibacterial and/or antiviral coating which is the modified clean coat layer.

In contrast to WO 2020/138469 A1, no additional coating is needed to confer antibacterial and/or antiviral properties to the spectacle lens, but an anyhow in spectacle lenses existing coating is modified.

In one exemplary embodiment, the spectacle lens comprising the at least one antibacterial and/or antiviral coating based on at least one modified clean coat layer described before further comprises at least one clean coat layer as outermost coating. The at least one clean coat layer typically comprises perfluoropolyethers, perfluoroalkyl silanes and/or perfluoroalkyl siloxanes. The at least one clean coat layer is typically applied by vacuum deposition, described above, further typically by i) optionally ion-beam assisted evaporation; ii) ion-beam co-sputtering; iii) cathode co-sputtering and/or iv) by plasma-assisted chemical vapor deposition. The at least one clean coat layer is typically deposited on the surface to be coated by evaporation, optionally ion-beam assisted. In case, the at least one clean coat layer is adjacent to and on top of the at least one antibacterial and/or antiviral coating based on at least one modified clean coat layer, i.e., the at least one clean coat layer being the outermost layer in the coating sequence, for components in the antibacterial and/or antiviral coating that are poorly soluble in water, this at least clean coat layer could act as a barrier to prevent the direct contact and largely reduces the contact area of a virus and the at least one biocidal inorganic component. For biocidal inorganic components that are presumed to be effective as metal ions, the at least one clean coat layer could slow down the migration of the metal ions. For biocidal inorganic components acting photocatalytically, the at least one clean coat layer may prevent the generation of reactive oxygen species, e.g., OH, $\cdot O_2^-$, $H_2O_2$. The average thickness of the at least one clean coat layer typically lies in a range from 1 nm to 50 nm, further typically from 1 nm to 30 nm, more typically from 1 nm to 20 nm, and particularly typically from 1 nm to 10 nm. The average thickness of the at least one clean coat layer is typically determined by at least one scanning electron microscope photograph of a cross-section of the spectacle lens comprising at least a spectacle lens substrate and the at least one clean coat layer. In the at least one scanning electron microscope photograph, the physical thickness of the at least one clean coat layer is determined in at least three positions and the arithmetic average is formed thereof.

The outermost clean coat layer may cover an underneath directly adjacent at least one antibacterial and/or antiviral coating based on at least one modified clean coat layer completely or partially.

In contrast to CN 106772713 A, no binding layer between for example the antibacterial and/or antiviral coating and the at least one clean coat layer is necessary to achieve the necessary adhesion between the at least one antibacterial and/or antiviral coating based on at least one modified clean coat layer and the at least one clean coat layer. In the disclosed coating sequence of CN 106772713 A the antibacterial layer is underneath of the binding layer and the superhydrophobic layer. So, in CN 106772713 A the antibacterial layer is not in direct contact with a bacterial or viral contamination.

In a further exemplary embodiment, the spectacle lens comprising at least one antibacterial and/or antiviral coating based on at least one modified clean coat layer comprises at least one anti-fog coating. Typically, the at least one anti-fog coating is the outermost coating of the spectacle lens. In case the spectacle lens comprises at least one anti-fog coating and at least one clean coat layer, the at least one clean coat layer typically is the outermost coating thereof. As at least one clean coat layer the above described may be used. The at least one anti-fog coating typically comprises an antifogging resin or surfactant, including highly hydrophilic polymers such as polyvinyl alcohol, (sodium) polyacrylate, or polyurethane comprising hydrophilic groups. For example, commercially available are antifog resins under the names UVAF, AFC-GW, AFC-133P12G, AFC-SW6M and AFC-G*NK from Gelwell Biotech Corp. or Visgard Premium, Visgard Premium SE, Visgard Premium Plus and Visgard Elite from FSI Coating Technologies, Inc.

The average thickness of the at least one anti-fog coating is not subject to any special constraint. The average thickness of the at least one anti-fog coating lies typically in a range of from 1 μm to 20 μm, further typically in a range of from 2 μm to 17 μm, more typically in a range of from 3 μm to 15 μm, most typically in a range of from 4 μm to 12 μm and particularly typically in a range of from 5 μm to 10 μm. The average thickness is typically determined by at least one scanning electron microscope photograph of a cross-section of the spectacle lens comprising at least a spectacle lens substrate and at least one anti-fog coating. In the at least one scanning electron microscope photograph, the physical thickness of the at least one anti-fog coating is determined in at least three positions and the arithmetic average is formed thereof.

Alternatively or additionally to the aforementioned at least one antibacterial and/or antiviral coating based on at least one modified clean coat layer, the spectacle lens may comprise at least one antibacterial and/or antiviral coating based on at least one modified anti-fog coating. The at least one antibacterial and/or antiviral coating based on at least one modified anti-fog coating typically comprises at least one anti-fog component and at least one biocidal inorganic component. The at least one anti-fog component may be doped with the at least one biocidal inorganic component. The at least one anti-fog component typically comprises an antifogging resin or surfactant, described above. The at least one biocidal inorganic component typically comprises at least one biocidal inorganic metal, at least one biocidal inorganic metal oxide, at least one biocidal inorganic metal hydroxide, at least one biocidal inorganic metal oxide hydrate, at least one biocidal inorganic metal salt and/or metal sulfide as described above. The at least one antibacterial and/or antiviral coating based on at least one modified anti-fog coating may be applied analogously to one of the before mentioned methods, the co-deposition method, the diffusion process, the dip coating or spin coating process. So, no additional coating is needed to confer antibacterial and/or antiviral properties to the spectacle lens, but an anyhow in spectacle lenses existing coating is modified. In one exemplary embodiment, the biocidal component and the anti-fog component reside in a single layer and form a single layer. In a preferred exemplary embodiment, the at least one antibacterial and/or antiviral coating based on at least one modified anti-fog coating is the modified anti-fog coating described above. All the features and variations described with regard to the at least one antibacterial and/or antiviral coating based on at least one modified anti-fog coating also apply to the at least one antibacterial and/or antiviral coating which is the modified anti-fog coating.

Alternatively or additionally to the aforementioned at least one antibacterial and/or antiviral coating based on at least one modified clean coat layer and based on at least one modified anti-fog coating respectively, the spectacle lens may comprise at least one antibacterial and/or antiviral coating based on at least one modified antireflective coating. The at least one antibacterial and/or antiviral coating based on at least one modified antireflective coating typically comprises at least one antireflective component and at least one biocidal inorganic component. Typically, the at least one antireflective component comprises the at least one biocidal inorganic component. The at least one antireflective component typically comprises a multilayer stack. Typically, at least one layer of that multilayer stack, typically the outermost one, i.e., the one furthest away from the respective surface of the substrate, comprises the at least one biocidal inorganic component. Further typically, at least one layer of the multilayer stack of the at least one antireflective component comprises at least one biocidal inorganic component and at least one binding component. The at least one biocidal inorganic component typically comprises at least one biocidal inorganic metal, at least one biocidal inorganic metal oxide, metal hydroxide, metal oxide hydrate and/or metal sulfide as described above. The at least one binding component typically comprises at least one inorganic metal oxide, at least one inorganic metal hydroxide, at least one inorganic metal oxide hydrate and/or at least one inorganic metal sulfide. Each of the at least one inorganic metal oxide, the at least one inorganic metal hydroxide, the at least one inorganic metal oxide hydrate and/or the at least one inorganic metal sulfide typically is composed of or comprises silicon, typically $SiO_2$; titanium, typically TiO, $TiO_2$, $Ti_2O_3$, $Ti_3O_4$; aluminum, typically $Al_2O_3$; and/or zirconium, typically $ZrO_2$. The at least one binding inorganic component may comprise at least one metal oxide, at least one metal hydroxide, at least one metal oxide hydrate, at least one metal sulfide or a combination thereof. Further, as at least one metal oxide one type of metal oxide or a combination of different types of metal oxides, as at least one metal hydroxide one type of metal hydroxides or a combination of different types of metal hydroxides, as at least one metal oxide hydrate one type of metal oxide hydrate or a combination of different types of metal oxide hydrates and as at least one metal sulfide one type of metal sulfide or a combination of different types of metal sulfides may be used. Typically, the at least one binding inorganic component comprises at least one inorganic metal oxide, at least one metal hydroxide and/or at least one metal oxide hydrate composed of or comprising silicon, typically $SiO_2$; titanium, typically TiO, $TiO_2$, $Ti_2O_3$, $Ti_3O_4$; and/or zirconium, typically $ZrO_2$. Further typically, the at least one binding inorganic component comprises at least one inorganic metal oxide, at least one metal hydroxide and/or at least one metal oxide hydrate composed of or comprising silicon, typically $SiO_2$; and/or titanium, typically TiO, $TiO_2$, $Ti_2O_3$, $Ti_3O_4$. Particularly typically, the at least one binding inorganic component comprises at least one inorganic metal oxide, at least one metal hydroxide and/or at least one metal oxide hydrate composed of or comprising silicon, typically $SiO_2$. Typically, the at least one layer of the antireflective component do not comprise the identical biocidal inorganic component and binding inorganic component. The at least one metal oxide, at least one metal hydroxide, at least one metal oxide hydrate and/or at least one metal sulfide of the at least one biocidal inorganic component and of the at least one binding inorganic component are typically not identical. However, in case the at least one biocidal inorganic component and the at least one binding inorganic component comprise for example at least one metal oxide composed of or comprising the identical metal, for example titanium, it is preferred that the at least one biocidal inorganic component and the at least one binding inorganic component comprise different types of the at least one metal oxides, for example, $TiO_2$ and TiO. Alternatively, the at least one biocidal inorganic component and the at least one binding inorganic component may comprise for example the identical metal oxide but in a different crystal structure.

The at least one layer of the at least one antireflective component comprises the at least one biocidal inorganic component in an amount of a range from 1% by weight to 90% by weight, further typically from 10% by weight to 80% by weight, more typically from 15% by weight to 60% by weight, and particularly typically from 20% by weight to 40% by weight, each based on the total weight of the at least one layer of the antireflective component. The amounts for the at least one biocidal inorganic component given before apply for the use of one type of biocidal inorganic component as well as for the use of a combination of different types of biocidal inorganic components. One type of biocidal inorganic component may be based the identical or a different metal. For example, if one type of biocidal inorganic component comprises at least one metal oxide, the identical metal Ag could result in AgO and $Ag_2O$, different metal Ag and Cu could result in $Ag_2O$ and $Cu_2O$.

To simultaneously ensure a good adhesion of the at least one layer of the at least one antireflective component to at least one adjacent layer of the at least antireflective component, the at least one layer typically comprises the at least one binding inorganic component in an amount of a range from 10% by weight to 99% by weight, further typically from 20% by weight to 90% by weight, more typically from 40% by weight to 85% by weight and particularly typically from 60% by weight to 80% by weight, each based on the total weight of the at least one layer. The amounts for the at least one binding inorganic component mentioned before apply for the use of one type of binding inorganic component as well as for the use of a combination of different types of binding inorganic components. One type of binding inorganic components may comprise the identical or a different metal ion.

The respective amounts of the at least one biocidal inorganic component and the at least one binding inorganic component given above are typically determined by a scanning electron microscope equipped with energy dispersive X-ray spectroscopy.

The average thickness of the at least one layer of the at least one antireflective component typically lies in a range of from 1 nm to 100 nm, further typically from 3 nm to 60 nm, more typically from 4 nm to 40 nm and most typically from 5 nm to 20 nm. The physical thickness of the at least one layer of the at least one antireflective coating typically is determined by a scanning electron microscope photograph of a cross-section of the spectacle lens comprising a spectacle lens substrate and the at least one layer. The physical thickness of the at least one layer is therein determined in at least three positions and the arithmetic average is formed thereof.

The before mentioned average thickness ranges for the at least one layer of the at least one antireflective component typically ensure a long term antibacterial and/or antiviral effect of the at least one antibacterial and/or antiviral coating based on at least one modified antireflective coating, without significantly affecting the desired optical properties of the spectacle lens, in particular without significantly affecting the desired optical properties of the at least one antireflective coating on which the at least one antibacterial and/or antiviral coating is based on. Phrased differently, the thickness of the at least one layer of the at least one antireflective component may be a compromise between the long term antibacterial and/or antiviral effect of the at least one antibacterial and/or antiviral coating based on at least one modified antireflective coating and the desired optical properties of the spectacle lens.

Typically, the at least one antibacterial and/or antiviral coating based on at least one modified antireflective coating typically is deposited under vacuum by i) optionally ion-beam assisted evaporation; ii) ion-beam sputtering; iii) cathode sputtering and/or by iv) plasma-assisted chemical vapor deposition. The at least one antibacterial and/or antiviral coating based on at least one modified antireflective coating typically is applied via ion-beam assisted evaporation. The at least one layer of the at least one antireflective component comprising the at least one biocidal inorganic component and the at least one binding inorganic component typically is applied via ion-beam assisted co-evaporation, analogously to the above described co-evaporation method.

Again, no additional coating is needed to confer antibacterial and/or antiviral properties to the spectacle lens, but an anyhow in spectacle lenses existing coating is modified. In one exemplary embodiment, the biocidal component and the antireflective component reside in a single layer and forms a single layer. In a preferred exemplary embodiment, the at least one antibacterial and/or antiviral coating based on at least one modified antireflective coating is the modified antireflective coating described above. All the features and variations described with regard to the at least one antibacterial and/or antiviral coating based on at least one modified antireflective coating also apply to the at least one antibacterial and/or antiviral coating which is the modified antireflective coating.

In one exemplary embodiment, the at least one antibacterial and/or antiviral coating based on at least one modified antireflective coating is not the outermost coating of the spectacle lens, i.e., the spectacle lens comprises at least one outermost coating different from the at least one antibacterial and/or antiviral coating based on at least one modified antireflective coating. For example, the spectacle lens may comprise at least one anti-fog coating as outermost coating or at least one clean coat layer as outermost coating, the at least one antibacterial and/or antiviral coating based on at least one modified antireflective coating and the at least one outermost coating typically being directly adjacent to each other. Directly adjacent to each other means that no further coating is located in-between the at least one antibacterial and/or antiviral coating based on at least one modified antireflective coating and the at least one outermost coating. Directly adjacent does not necessarily mean that the at least one antibacterial and/or antiviral coating based on at least one modified antireflective coating is completely covered with the at least one outermost coating. The at least one outermost coating different from the at least one antibacterial and/or antiviral coating based on at least one modified antireflective coating could either cover the adjacent at least one antibacterial and/or antiviral coating based on at least one modified reflective coating completely or partially. In contrast to CN 106772713 A typically no binding layer is located between the at least one antibacterial and/or antiviral coating based on at least one modified antireflective coating and at least one outermost coating. Further, is has been found that advantageously no binding layer in-between the at least one antibacterial and/or antiviral coating based on at least one modified antireflective coating and the at least one outermost coating is needed for ensuring the adhesion between the at least one antibacterial and/or antiviral coating based on at least one modified antireflective coating and the at least one outermost coating. In CN 106772713 A the binding layer is needed to increase the adhesion between the antibacterial layer and the top layer. Using at least one antibacterial and/or antiviral coating based on at least one modified antireflective coating the adhesion between this at least one antibacterial and/or antiviral coating and the at least one coating adjacent thereto needs not to be improved. With respect to the at least one outermost coating being different from the at least one antibacterial and/or antiviral coating based on at least one modified antireflective coating, typically the outermost coating being at least one anti-fog coating or at least one clean coat layer, a good adhesion between the at least one antibacterial and/or antiviral coating based on at least one modified antireflective coating and the at least one outermost coating is achieved as the at least one layer of the at least one antireflective component already comprises at least one binding component. This in turn renders an additional binding layer as in CN 106772713 A redundant. The absence of such an additional binding layer in-between the at least one antibacterial and/or antiviral coating based on at least one modified antireflective coating and at least one outermost coating different thereto also has the advantage that the distance of the at least one antibacterial and/or antiviral coating based on at least one modified antireflective coating to the respective outermost surface of the spectacle lens is not increased. Therefore, in the absence of such an additional binding layer, typically the effectiveness of the at least one antibacterial and/or antiviral coating based on at least one modified antireflective coating against bacteria and/or viruses is not reduced due to that barrier of an additional binding layer preventing the contact between the at least one antibacterial and/or antiviral coating based on at least one modified antireflective coating and the bacteria and/or viruses. In case the spectacle lens comprises at least one clean coat layer and at least one anti-fog coating, the at least one clean coat layer is the outermost coating thereof.

In one exemplary embodiment, the spectacle lens comprises at least one antibacterial and/or antiviral coating based on at least one modified clean coat layer, described above, and at least one antibacterial and/or antiviral coating based on at least one modified antireflective coating, described above as well. The antibacterial and/or antiviral coating based on at least one modified clean coat layer typically is the outermost coating thereof. The spectacle lens typically comprises on the front surface and on the back surface thereof at least one antibacterial and/or antiviral coating based on at least one modified clean coat layer and at least one antibacterial and/or antiviral coating based on at least one modified antireflective coating. Alternatively, the spectacle lens comprises on one of the surfaces of the spectacle lens substrate both before mentioned antibacterial and/or antiviral coatings and on the other surface only one of the before mentioned antibacterial and/or antiviral coatings. In each case the spectacle lens comprises at least one antibacterial and/or antiviral coating based on at least one modified clean coat layer and at least one antibacterial and/or antiviral coating based on at least one modified antireflective coating the at least one biocidal inorganic component of both antibacterial and/or antiviral coatings may be identical or different from each other. The at least one biocidal inorganic component, already described above, may be identical or different with respect to the type of the at least one biocidal inorganic component and/or with respect to the metal on which the at least one biocidal inorganic component is based on. In case the identical or same at least one biocidal inorganic component, for example Ag or $Ag_2O$, is comprised in both antibacterial and/or antiviral coatings, and both antibacterial and/or antiviral coatings are typically at least applied on the same surface of the spectacle lens substrate, the antibacterial and/or antiviral effect of the spectacle lens may be enhanced or prolonged. Alternatively, the amount of the at least one biocidal inorganic component in each the antibacterial and/or antiviral coating may be reduced. Such a reduction of the at least one biocidal inorganic component may be beneficial to reduce the influence of the at least one biocidal inorganic component on the optical performance of the spectacle lens.

In case the at least one biocidal inorganic component is different in each of the antibacterial and/or antiviral coatings, the antibacterial and/or antiviral effect of the spectacle lens may be adaptable or variable with respect to the bacteria and/or viruses to be controlled.

A further advantage of applying at least one antibacterial and/or antiviral coating based on at least one modified clean coat layer and at least one antibacterial and/or antiviral coating based on at least one modified antireflective coating is that if one of the both antibacterial and/or antiviral coatings stops being effective the other one may still provide antibacterial and/or antiviral activity.

Both the at least one antibacterial and/or antiviral coating based on at least one modified clean coat layer and at least one antibacterial and/or antiviral coating based on at least one modified antireflective coating fulfill a double function in the coating sequence of the spectacle lens. The at least one antibacterial and/or antiviral coating based on at least one modified clean coat layer acts as antibacterial and/or antiviral coating as well as clean coat layer. The at least one antibacterial and/or antiviral coating based on at least one antireflective coating acts as antibacterial and/or antiviral coating as well as antireflective coating. By applying at least one antibacterial and/or antiviral coating based on at least one modified clean coat layer and at least one antibacterial and/or antiviral coating based on at least one modified antireflective coating, spectacle lenses that would comprise anyhow at least one antireflective coating and at least one clean coat layer in their coating sequence, exhibit additionally antibacterial and/or antiviral activity. For the spectacle lens to additionally exhibit antibacterial and/or antiviral activity no further adaption of an existing coating sequence is necessary, e.g., with respect to any variations of the order of the coating sequence or with respect to adding further layers to the coating sequence.

In case the spectacle lens comprises at least one antibacterial and/or antiviral coating based on at least one modified clean coat layer and at least one antibacterial and/or antiviral coating based on at least one modified antireflective coating directly adjacent to each other, the outermost coating thereof may cover the underneath one completely or only partially.

Summarizing, the exemplary embodiments according to the following Clauses are particularly typical within the scope of the present disclosure:

Clause 1: Spectacle lens comprising a spectacle lens substrate and at least one coating, wherein the at least one coating comprises an antibacterial and/or antiviral coating based on at least one modified clean coat layer, typically the at least one modified clean coat layer comprising at least one biocidal component and at least one clean coat component.

Clause 2: Spectacle lens according to clause 1, wherein the at least one biocidal component is selected from at least one of the group consisting of at least one metal, at least one metal oxide, at least one metal hydroxide, at least one metal oxide hydrate, at least one metal sulfide, and at least one coordination complex.

Clause 3: Spectacle lens according to any one of the preceding clauses, wherein the at least one coordination complex acts as antifungal agent, as antibacterial agent and/or as antiviral agent.

Clause 4: Spectacle lens according to any one of the preceding clauses, wherein the at least one coordination complex is a coordination complex of copper, typically cooper thiocyanate or copper pyrithione or a coordination complex of zinc, typically zinc pyrithione.

Clause 5: Spectacle lens according to any one of the preceding clauses, wherein the at least one biocidal component is distributed in the form of distinct particles within and/or on top of the at least one antibacterial and/or antiviral coating.

Clause 6: Spectacle lens according to any one of the preceding clauses, wherein the spectacle lens comprises at least one antibacterial and/or antiviral coating based on at least one modified clean coat layer and at least one antibacterial and/or antiviral coating based on at least one modified antireflective coating, typically the at least one antibacterial and/or antiviral coating based on the modified at least one clean coat layer being the outermost coating thereof.

Clause 7: Spectacle lens according to any one of the preceding clauses, wherein the front surface and/or the back surface of the spectacle lens substrate each comprises at least one antibacterial and/or antiviral coating based on at least one modified clean coat layer directly adjacent to at least one antibacterial and/or antiviral coating, typically the at least one antibacterial and/or antiviral coating based on at least one modified clean coat layer being the outermost coating thereof.

Clause 8. Spectacle lens according to any one of the preceding clauses, wherein each antibacterial and/or antiviral coating of the spectacle lens comprises at least one biocidal component, at least two antibacterial and/or antiviral coatings comprising at least one biocidal component being identical or different from each other, identical or different typically with respect to the type and/or the concentration of the at least one biocidal component.

Clause 9: Spectacle lens according to any one of the preceding clauses comprising a spectacle lens substrate and at least two antibacterial and/or antiviral coating, wherein at least one of the antibacterial and/or antiviral coatings comprises at least one biocidal component selected from the group consisting of at least one metal, at least one metal oxide, at least one metal hydroxide, at least one metal oxide hydrate, at least one metal sulfide and at least one coordination complex, and at least one binding agent selected from the group consisting of at least one metal oxide, at least one metal hydroxide, at least one metal oxide hydrate and at least one metal sulfide, and wherein at least one of the antibacterial and/or antiviral coatings is based on a modified clean coat layer and/or on a modified anti-fog coating.

Clause 10: Spectacle lens according to any one of the preceding clauses, wherein the spectacle lens comprises at least one clean coat layer or at least one anti-fog coating each as outermost coating of the at least one coating of the spectacle lens, the outermost coating covering the underneath directly adjacent coating completely or partially, partially in any arbitrary shape of islands.

Clause 11: Spectacle lens according to any one of the preceding clauses, wherein the spectacle lens comprises at least one clean coat layer and at least one anti-fog coating, the at least one clean coat layer being the outermost coating thereof, the outermost coating covering the underneath directly adjacent coating completely or partially, partially in any arbitrary shape of islands.

Clause 12: Spectacle lens comprising a spectacle lens substrate and at least one coating, wherein the at least one coating comprises at least one antibacterial and/or antiviral coating based on at least one modified antireflective coating.

Clause 13: Spectacle lens comprising a spectacle lens substrate and at least one antibacterial and/or antireflective coating, wherein the at least one antibacterial and/or antireflective coating comprises at least one modified antireflective coating, at least one modified clean coat layer and/or at least one modified anti-fog coating, each modified coating typically comprising at least one biocidal component.

Clause 14: Method for manufacturing a spectacle lens comprising a spectacle lens substrate and at least one antibacterial and/or antiviral coating, wherein the method comprises the following steps typically in the given order:
Providing a spectacle lens substrate comprising an uncoated or precoated front surface and an uncoated or precoated back surface;
Co-depositing under vacuum on at least one of the uncoated or precoated surfaces at least one biocidal component and at least one component different to the at least one biocidal component resulting in the at least one antibacterial and/or antiviral coating, the at least one component different to the at least one biocidal component typically being at least one clean coat component and/or at least one anti-fog component.

Clause 15: Method for manufacturing a spectacle lens comprising a spectacle lens substrate and at least one antibacterial and/or antiviral coating based on at least one modified clean coat layer, wherein the method comprises the following steps typically in the given order:
Providing a spectacle lens substrate comprising an uncoated or precoated front surface and an uncoated or precoated back surface;
Depositing under vacuum on at least one of the uncoated or precoated surfaces at least one clean coat component resulting at least one clean coat layer or at least one anti-fog component resulting in at least one anti-fog coating;
Dispersing at least one biocidal component in at least one solvent and/or dissolving at least one biocidal component in at least one solvent, the dispersed at least one biocidal component and the dissolved at least one biocidal component typically being different to each other;
Modifying the at least one clean coat layer with the at least one biocidal component, typically by diffusion of the at least one biocidal component into the at least one clean coat layer, the at least one biocidal component diffusing either completely or partially into the at least one clean coat layer, resulting in at least one antibacterial and/or antiviral coating based on at least one modified clean coat layer; or
Modifying the at least one anti-fog coating with the at least one biocidal component, typically by diffusion of the at least one biocidal component into the at least one anti-fog coating, the at least one biocidal component diffusing either completely or partially into the at least one anti-fog coating, resulting in at least one antibacterial and/or antiviral coating based on at least one modified anti-fog coating.

Clause 16: Method of manufacturing a spectacle lens comprising a spectacle lens substrate and at least one antibacterial and/or antiviral coating, wherein the method comprises the following steps typically in the given order:
Providing a spectacle lens substrate comprising an uncoated or precoated front surface and an uncoated or precoated back surface;
Dispersing at least one biocidal component in at least one coating component, typically at least one clean coat component or at least one anti-fog component, and optionally in at least one solvent resulting in a dispersion comprising the at least one biocidal component;
Applying the dispersion to at least one of the uncoated or precoated surfaces of the spectacle lens substrate, typically by dip coating or spin coating;
Curing the applied dispersion, typically at a temperature selected from a range from 30° C. to 70° C., further typically for a time selected from a range from 30 min to 300 min, resulting in at least one antibacterial and/or antiviral coating.

Clause 17: Spectacle lens according to any one of the preceding clauses or method according to any one of the preceding clauses, wherein the at least one modified coating exhibits additionally to its originally intended property an antibacterial effect and/or an antiviral effect, typically additionally to its optical and/or functional property, further typically additionally to its antireflective property, its anti-fogging property and/or its easy to clean property.

The following examples are non-limiting for the scope of the disclosure:

I SPECTACLE LENS ACCORDING TO THE EXAMPLES AND COMPARATIVE EXAMPLES

Comparative Example 1

An uncoated Zeiss CR39 plano flat sheet lens substrate based on polyallyldiglycol carbonate was firstly coated by the dip method with composition according to example 2 of EP 2 578 649 A1 and then vacuum deposited with a five layers antireflective coating that the material of each layer is $SiO_2$, $CrO_2$, $SiO_2$, $CrO_2$, $SiO_2$ respectively. The layer thicknesses were 30 nm, 30 nm, 20 nm, 60 nm and 90 nm. Afterwards, the spectacle lens was further coated a hydrophobic clean coat layer with a thickness of 5 nm of the hydrophobic material Cotec 900 from COTECH GmbH.

Example 1

An uncoated Zeiss CR39 plano flat sheet lens substrate based on polyallyldiglycol carbonate was firstly coated by the dip method with composition according to example 2 of EP 2 578 649 A1 then vacuum deposited with a five layers antireflective coating that the material of each layer is $SiO_2$, $CrO_2$, $SiO_2$, $CrO_2$, $SiO_2$ respectively. The layer thicknesses were 30 nm, 30 nm, 20 nm, 60 nm and 90 nm. An antibacterial and/or antiviral coating based on clean coat layer was further deposited on this surface: the biocidal compound was deposited by thermal evaporation and the clean coat component was deposited by electron beam evaporation and ion-beam assistance with purged 30 sccm $O_2$ in chamber. This antibacterial and/or antiviral coating consists of 20% by weight of the biocidal component $Ag_2O$ and 80% by weight of the clean coat component and exhibits a total thickness of 5 nm.

Example 2

An uncoated Zeiss CR39 plano flat sheet lens substrate based on polyallyldiglycol carbonate was firstly coated by the dip method with composition according to example 2 of EP 2 578 649 A1 then vacuum deposited with a same antireflective coating as in example 1. An antibacterial and/or antiviral coating based on clean coat layer was further deposited on this surface: the biocidal compound was deposited by thermal evaporation and the clean coat component was deposited by electron beam evaporation and ion-beam assistance with purged 30 sccm $O_2$ in chamber. This antibacterial and/or antiviral coating consists of 20% by weight of the biocidal component CuO and 80% by weight of the clean coat component and exhibits a total thickness of 5 nm.

Example 3

A plano flat sheet lens that prepared by the process according to comparative example 1 was fixed on a lens chuck with one side facing up. A cotton cloth fully soaked with 0.1 mol/L $AgNO_3$ water solution was used to manually wipe on the lens for 200 cycles. The obtained lens was further dried in a curing oven for 30 min at 50° C.

Example 4

A plano flat sheet lens that prepared by the process according to comparative example 1 was fixed on a lens chuck with one side facing up. A cotton cloth fully soaked with 0.5 mol/L AgNO3 water solution was used to manually wipe on the lens for 200 cycles. The obtained lens was further dried in a curing oven for 30 min at 50° C.

Example 5

An uncoated Zeiss CR39 plano flat sheet lens substrate based on polyallyldiglycol carbonate was firstly coated by the dip method with a hardening silicone film and then vacuum deposited with a same antireflection coating as example1. An antibacterial and/or antiviral coating based on clean coat component was further applied on the top surface by dip coating. The resin for the dip coating process is prepared by adding 0.05 g 0.1 mol/L $AgNO_3$ ethanol solution in 100 g Cotec Duralon from COTECH GmbH. The obtained lens was further dried in a curing oven for 3 hrs at 50° C.

II CHARACTERIZATION OF THE SPECTACLE LENSES ACCORDING TO THE EXAMPLES AND COMPARATIVE EXAMPLES

IIa Determination of Contact Angle

The water contact angle of the spectacle lenses according to the examples and comparative was measured with an OCA20 contact angle meter from Dataphysics; deionized water was used as liquid. Droplet size 2 μL.

IIb Antibacterial and/or Antiviral Effect

The antibacterial effect of the spectacle lenses of the examples and comparative example has been assessed according to the following procedure:

Spectacle lens sample preparation: the spectacle lenses according to the examples and the comparative examples were firstly sterilized by a dry-heat sterilizer at 170° C. for 60 mins and then further sterilized in an autoclave at 121° C. for 15 mins. The control samples were made of medical grade polyethylene and sterilized using the same procedure.

Bacterial preparation and test inoculum: the selected bacteria were transferred from the stock culture to the slant culture medium and incubated for 24 hrs at 35° C., afterwards, this culture is further transferred to a fresh slant culture medium for another 24 hrs at 35° C. Further, the bacterial culture is countered to obtain the desired concentration.

Inoculation and incubation: certain volume of test inoculum was added to the test sample surface for incubation Recovery of bacteria: after 24 hr, the bacteria was recovered from the test sample surface and counted. The antibacterial activity and bacterial reduction ratio was calculated according to equation:

$$\text{Reduction ratio} = (C_t - T_t)/C_t$$

where
$C_t$=number of viable bacterial recovered from untreated test specimen (control sample) after 24 hr and
$T_t$=number of viable bacterial recovered from treated test specimen (lens sample) after 24 hr, $$\text{Antibacterial activity} = U_t - A_t$$

where
$U_t$=the average of the common logarithm of the number of viable bacterial recovered from untreated test specimen (control sample) after 24 hrs
$A_t$=the average of the common logarithm of the number of viable bacterial recovered from treated test specimen (lens sample) after 24 hrs.

For assessing the antiviral effect of the spectacle lenses of the examples and comparative example, the following procedure has been applied:

Spectacle lens sample preparation: the spectacle lenses according to the examples and comparative examples were sterilized by a solution of 70% alcohol/30% water and ready as "test sample"

Control: the control was to ensure the virus activity when it was not treated with the test samples. In the control a 1 ml plastic vial made of medical grade polyethylene that was sterilized using the same procedure as the lens samples, Virus preparation: the selected virus was diluted with the maintenance medium (DMEM: Dulbecco's Modified Eagle Medium) contains 10% FBS (Fetal Bovine Serum) to obtain a virus suspension of 1000 PFU (Plaque forming units).

Cell preparation and growth: the selected host cell was planked onto a six well plastic plate and 1 ml of DMEM growth medium contains 10% FBS was added for cell growth. The growth period took 12 to 16 hrs. Afterwards, the growth medium was removed and 500 μl of maintenance medium was added.

Treatment and recovery of virus: for test samples, 100 μl of virus suspension was added to the spectacle lens surface for treatment of 24 hrs. Afterwards, the suspension was recovered from the spectacle lens surface and added to the six wells plastic plate. The spectacle lens was further washed for 3 times with 50 μl maintenance medium to fully recover the virus. For the control, 100 μl of virus suspension was added to the plastic vial for 24 hrs. Afterwards, the suspension was recovered from the vial and added to the six wells plastic plate. The vial was further washed for 3 times with 50 μl maintenance medium to fully recover the virus.

Cell infection: the recovered virus stays in the six wells plastic plate for an infection of 24 hrs.

Determine cell infection rate: the cell in the six wells plastic plate was collected and put under a flow cytometry to determine the cell infection rate.

The virus viability was obtained by the calculating infection rate normalize to the control (control=100%).

The spectacle lenses according to the examples and the comparative examples has been assessed with respect to the bacteria or viruses as shown in table 2 below.

TABLE 2

| Example/ Comparative example | Biocidal component | Clean Coat material | Water Contact Angle | Antibacterial reduction ratio - staphylococcus aureus | Antibacterial activity - staphylococcus aureus | Virus viability - Herpes virus |
|---|---|---|---|---|---|---|
| Comparative example 1 | — | Cotec 900 | 117° | 41.3% | 0.2 | 90% |
| Example 1 Co-deposition | $Ag_2O$ | Cotec 900 | 115° | >99.9% | 6.2 | <1% |
| Example 2 Co-deposition | CuO | Cotec 900 | 112° | >99.9% | 5.6 | 20% |
| Example 3 Diffusion | 0.1 mol/L $AgNO_3$ in water | Cotec 900 | 116° | >99.9% | 5.6 | 5% |
| Example 4 Diffusion | 0.5 mol/L $AgNO_3$ in water | Cotec 900 | 117° | >99.9% | 5.6 | 4.2% |
| Example 5 Dip coating | 0.1 mol/L $AgNO_3$ in ethanol | Cotec Duralon | 115° | >99.9% | 5.6 | 10% |

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A spectacle lens comprising:
   a spectacle lens substrate; and
   at least one antibacterial and/or antiviral coating, wherein the at least one antibacterial and/or antiviral coating is at least an outermost coating of the spectacle lens on the front surface thereof and/or at least the outermost coating of the spectacle lens on the back surface thereof, which is at least one selected from the group consisting of a clean coat layer, an anti-fog coating, and an antireflective coating modified to contain at least one biocidal component, wherein the spectacle lens includes on at least one surface thereof at least two coatings modified to exhibit an antibacterial effect and/or an antiviral effect.

2. The spectacle lens according to claim 1, wherein the at least two modified coatings are directly adjacent to each other, one of the at least two modified coatings being the outermost coating thereof.

3. The spectacle lens according to claim 1, wherein the at least two modified coatings each comprises at least one biocidal component, the at least one biocidal component of each modified coating being identical to or different from the at least one biocidal component of the other modified coating.

4. The spectacle lens according to claim 1, wherein the at least one biocidal component is selected from at least one of the group consisting of at least one biocidal inorganic metal, at least one biocidal inorganic metal oxide, at least one biocidal inorganic metal hydroxide, at least one biocidal inorganic metal oxide hydrate, and at least one biocidal inorganic metal sulfide.

5. The spectacle lens according to claim 4, wherein the at least one biocidal inorganic metal, the at least one biocidal inorganic metal oxide, the at least one biocidal inorganic metal hydroxide, the at least one biocidal inorganic metal oxide hydrate, and the at least one biocidal inorganic metal sulfide each is composed of or comprises silver, copper, titanium, zinc, and/or iron.

6. A method for manufacturing a spectacle lens containing a spectacle lens substrate and at least one antibacterial and/or antiviral coating, the method comprising the following steps:
   providing a spectacle lens substrate having an uncoated or precoated front surface and an uncoated or precoated back surface;

depositing under vacuum on at least one of the uncoated or precoated surfaces at least one clean coat component resulting in at least one clean coat layer or at least one anti-fog component resulting in at least one anti-fog coating;

dispersing at least one biocidal component in at least one solvent and/or dissolving at least one biocidal component in at least one solvent, the dispersed at least one biocidal component and the dissolved at least one biocidal component being different from each other;

modifying the at least one clean coat layer with the at least one biocidal component by diffusion of the at least one biocidal component into the at least one clean coat layer, the at least one biocidal component diffusing either completely or partially into the at least one clean coat layer, resulting in the at least one antibacterial and/or antiviral coating based on at least one modified clean coat layer; or modifying the at least one anti-fog coating with the at least one biocidal component by diffusion of the at least one biocidal component into the at least one anti-fog coating, the at least one biocidal component diffusing either completely or partially into the at least one anti-fog coating, resulting in the at least one antibacterial and/or antiviral coating based on at least one modified anti-fog coating, wherein the at least one clean coat layer or the at least one anti-fog coating is modified after the depositing step.

7. The method according to claim 6, wherein the at least one biocidal component is selected from at least one of the group consisting of at least one metal, at least one metal oxide, at least one metal hydroxide, at least one metal oxide hydrate, at least one metal salt and at least one metal sulfide.

8. The method according to claim 6, wherein the method comprises the additional step:

applying by vacuum deposition at least one clean coat layer adjacent to and on top of the at least one modified clean coat layer.

9. The method according to claim 8, wherein the at least one clean coat layer covers the directly adjacent modified clean coat layer completely or partially.

10. A spectacle lens comprising:

a spectacle lens substrate; and at least one antibacterial and/or antiviral coating, wherein the at least one antibacterial and/or antiviral coating is at least an outermost coating of the spectacle lens on the front surface thereof and/or at least the outermost coating of the spectacle lens on the back surface thereof, which is at least one selected from the group consisting of a clean coat layer, an anti-fog coating, and an antireflective coating modified to contain at least one biocidal component, wherein the spectacle lens includes on at least one surface thereof at least two coatings modified to exhibit an antibacterial effect and/or an antiviral effect, and wherein the at least two modified coatings are directly adjacent to each other, one of the at least two modified coatings being the outermost coating thereof.

* * * * *

UNITED STATES PATENT AND TRADEMARK OFFICE
CERTIFICATE OF CORRECTION

| | |
|---|---|
| PATENT NO. | : 11,940,596 B2 |
| APPLICATION NO. | : 18/158344 |
| DATED | : March 26, 2024 |
| INVENTOR(S) | : Emad Flear Aziz et al. |

It is certified that error appears in the above-identified patent and that said Letters Patent is hereby corrected as shown below:

In the Specification

In Column 9, Line 3: change "A1" to -- Al --

In Column 9, Line 5: change "AIX$_3$" to -- AlX$_3$ --

In Column 20, Line 65: change "tri acrylate" to -- triacrylate --

In Column 20, Line 66: change "tri ethyl ene glycol" to -- triethyleneglycol --

In Column 21, Line 17: change "trii soprop anol amine" to -- triisopropanolamine --

In Column 21, Line 17: change "dim ethyl" to -- dimethyl --

In Column 21, Line 18: change "di ethyl aminoethyl" to -- diethylaminoethyl --

In Column 39, Line 53: change "examplel" to -- example 1 --

Signed and Sealed this
Eighteenth Day of June, 2024

Katherine Kelly Vidal
*Director of the United States Patent and Trademark Office*